(12) United States Patent
Wang et al.

(10) Patent No.: US 11,751,111 B2
(45) Date of Patent: *Sep. 5, 2023

(54) WIRELESS TERMINAL ROAMING

(71) Applicant: Juniper Networks, Inc., Sunnyvale, CA (US)

(72) Inventors: Wenfeng Wang, Cupertino, CA (US); Jacob Thomas, Saratoga, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/662,238

(22) Filed: May 6, 2022

(65) Prior Publication Data

US 2022/0264398 A1 Aug. 18, 2022

Related U.S. Application Data

(63) Continuation of application No. 17/109,837, filed on Dec. 2, 2020, now Pat. No. 11,330,486, which is a
(Continued)

(51) Int. Cl.
| | |
|---|---|
| *H04B 1/16* | (2006.01) |
| *H04W 36/00* | (2009.01) |
| *H04W 8/02* | (2009.01) |

(52) U.S. Cl.
CPC ....... *H04W 36/00837* (2018.08); *H04W 8/02* (2013.01); *H04W 36/0009* (2018.08)

(58) Field of Classification Search
CPC ............ H04W 36/00837; H04W 8/02; H04W 36/0009; H04W 84/12; H04W 36/30;
(Continued)

(56) References Cited

U.S. PATENT DOCUMENTS 8,077,662 B2 * 12/2011 Srinivasan ............ H04W 24/02
370/328
8,204,029 B2 * 6/2012 Stephenson ............. H04L 63/10
370/332
(Continued)

FOREIGN PATENT DOCUMENTS

EP 3429255 A1 1/2019

OTHER PUBLICATIONS

"European Application Serial No. 19218459.6, Extended European Search Report dated Jul. 15, 2020", 12 pgs.
(Continued)

*Primary Examiner* — Amancio Gonzalez
(74) *Attorney, Agent, or Firm* — Shumaker & Sieffert, P.A.

(57) ABSTRACT

Disclosed are methods and systems for improved wireless terminal roaming. In some embodiments, a management module determines access point density metrics for a plurality of centrally managed access points of a communications site. The density metric considers an average RSSI of access point signals received by other access points of the site, and each access point's contribution to the average. A determination of whether a particular wireless terminal roams is based on the density metrics of the source and target access point, as well as statistics relating to a current capacity of each of the access points. The disclosed embodiments may determine that a wireless terminal should transition/roam away from an access point even when that access point's RSSI value at the wireless terminal is above a threshold that would cause traditional methods to inhibit roaming.

20 Claims, 11 Drawing Sheets

Related U.S. Application Data continuation of application No. 16/585,581, filed on Sep. 27, 2019, now Pat. No. 10,863,400.

(58) Field of Classification Search
CPC . H04W 48/20; H04W 36/0085; H04W 36/26; H04L 43/04; H04L 43/08; H04L 43/16
USPC ...................................................... 455/431.1
See application file for complete search history.

(56) References Cited

U.S. PATENT DOCUMENTS

| | | | | |
|---|---|---|---|---|
| 8,588,844 | B2* | 11/2013 | Shpak | H04B 7/024 455/524 |
| 8,599,734 | B1* | 12/2013 | Ram | H04L 1/0007 370/312 |
| 8,937,928 | B2* | 1/2015 | Ngo | H04W 72/54 370/332 |
| 9,071,993 | B1* | 6/2015 | Duo | H04W 24/02 |
| 9,081,080 | B2* | 7/2015 | Gupta | H04W 52/28 |
| 9,197,528 | B2* | 11/2015 | Babiarz | H04W 36/20 |
| 9,510,149 | B2* | 11/2016 | Kiskani | H04W 4/029 |
| 9,635,597 | B2* | 4/2017 | Kaushik | H04L 67/10 |
| 9,642,047 | B2* | 5/2017 | Kim | H04W 36/0072 |
| 9,713,163 | B2* | 7/2017 | Ni | H04W 72/12 |
| 9,794,846 | B2* | 10/2017 | Sankaranarayanan | H04W 36/20 |
| 9,998,966 | B2* | 6/2018 | Morita | H04W 36/0055 |
| 10,028,193 | B2* | 7/2018 | Gangadhar | H04W 36/24 |
| 10,117,065 | B1* | 10/2018 | De Lorenzo | H04W 4/33 |
| 10,383,039 | B2* | 8/2019 | Henry | H04W 36/00835 |
| 10,863,400 | B1* | 12/2020 | Wang | H04W 36/0009 |
| 10,935,629 | B2* | 3/2021 | Chae | G01S 5/0244 |
| 11,330,486 | B2 | 5/2022 | Wang et al. | |
| 2005/0215265 | A1* | 9/2005 | Sharma | H04W 36/22 455/450 |
| 2008/0095048 | A1* | 4/2008 | Zhong | H04W 28/12 370/229 |
| 2008/0174403 | A1* | 7/2008 | Wolpert | G07C 9/27 340/5.61 |
| 2012/0300746 | A1* | 11/2012 | Ibrahim | H04W 36/00835 370/331 |
| 2013/0223423 | A1 | 8/2013 | Lee et al. | |
| 2013/0259005 | A1* | 10/2013 | Kulkarni | H04W 48/02 370/332 |
| 2015/0334598 | A1* | 11/2015 | Duo | H04W 24/02 370/338 |
| 2016/0112944 | A1* | 4/2016 | Zhou | H04W 12/06 370/338 |
| 2016/0183181 | A1 | 6/2016 | Lee et al. | |
| 2017/0332292 | A1 | 11/2017 | Ponnuswamy | |
| 2018/0352493 | A1* | 12/2018 | Strater | H04W 36/0058 |
| 2019/0082365 | A1* | 3/2019 | Van Oost | H04W 36/0083 |
| 2019/0191369 | A1 | 6/2019 | Desai et al. | |
| 2019/0297546 | A1* | 9/2019 | Likar | H04W 36/00835 |
| 2020/0037392 | A1* | 1/2020 | Qui | H04W 24/02 |

OTHER PUBLICATIONS

Notice of Allowance from U.S. Appl. No. 17/109,837, dated Feb. 23, 2022, 9 pp.

Prosecution History from U.S. Appl. No. 16/585,581, now issued U.S. Pat. No. 10,863,400, dated Apr. 28, 2020 through Oct. 22, 2020, 48 pp.

Response to Extended Search Report dated Jul. 15, 2020, from counterpart European Application No. 19218459.6, filed Sep. 24, 2021, 41 pp.

Notice of Intent to Grant and Text Intended to Grant from counterpart European Application No. 19218459.6 dated Mar. 23, 2023, 53 pp.

* cited by examiner

WIRELESS TERMINAL ROAMING

CROSS REFERENCE TO RELATED APPLICATIONS

This application is a continuation of U.S. patent application Ser. No. 17/109,837, filed Dec. 2, 2020, and entitled "Improved Wireless Terminal Roaming," which is a continuation of U.S. patent application Ser. No. 16/585,581, filed Sep. 27, 2019, issued as U.S. Pat. No. 10,863,400, and entitled "Wireless Terminal Roaming," each of which is incorporated by reference herein in its entirety.

FIELD

The present application relates to wireless communications. In particular, the disclosed subject matter improves roaming of mobile terminals from one access point to another.

BACKGROUND

A wireless terminal (WT) usually receives signals from multiple wireless access points (APs). The received signals may be at the same band or at different frequency bands. The strength of the received signals from the various access points is described via a received signal strength indicator (RSSI). The RSSI at a particular WT, based on signals from a particular AP, depends, in part, on a transmit power level used by that particular AP in the direction of the WT, a distance between the AP and the WT, and an attenuation of the media between the AP and the WT. Thus, when the mobile device roams within a coverage area of an AP, an RSSI of signals from the AP may vary.

When a WT enters an area covered (or serviced) by multiple APs, it generally associates itself with a first AP having a highest RSSI (first RSSI). As the WT roams in the area covered by the multiple APs, e.g., within enterprise domain, the RSSI of the first AP may be reduced relative to an initial level when the WT first associated with it. In some cases, a second RSSI of a second AP may become stronger than the first RSSI of the first AP. This difference in RSSI values may occur for a number of reasons, including a relative distance between the WT and the first AP increasing while a second relative distance between the WT and the second AP decreases.

As stronger RSSI values are generally associated with higher communication quality, it may be advantageous for the WT to break its association with the first AP and associate itself with the second AP. The act of breaking association with one AP and establishing association with another AP is called mobile device roaming. However, while roaming may increase the strength of the received signal and as such reduce the bit error rate on a communication channel, performing the transmission from the first AP to the second AP (roaming) consumes time and resources and as such has adverse impact on the performance of the communication.

To prevent this roaming chatter, Wi-Fi networks employ a fixed threshold. For example, a WT may be configured to roam from a first AP to a second AP only if the signal from the first AP is lower than e.g., −72 dbm. While the use of a fixed threshold prevents roaming chatter, the network may remain inefficiently utilized. Thus, there is a need for improved methods for determining when a WT should roam to another AP.

DETAILED DESCRIPTION

Figure 1:
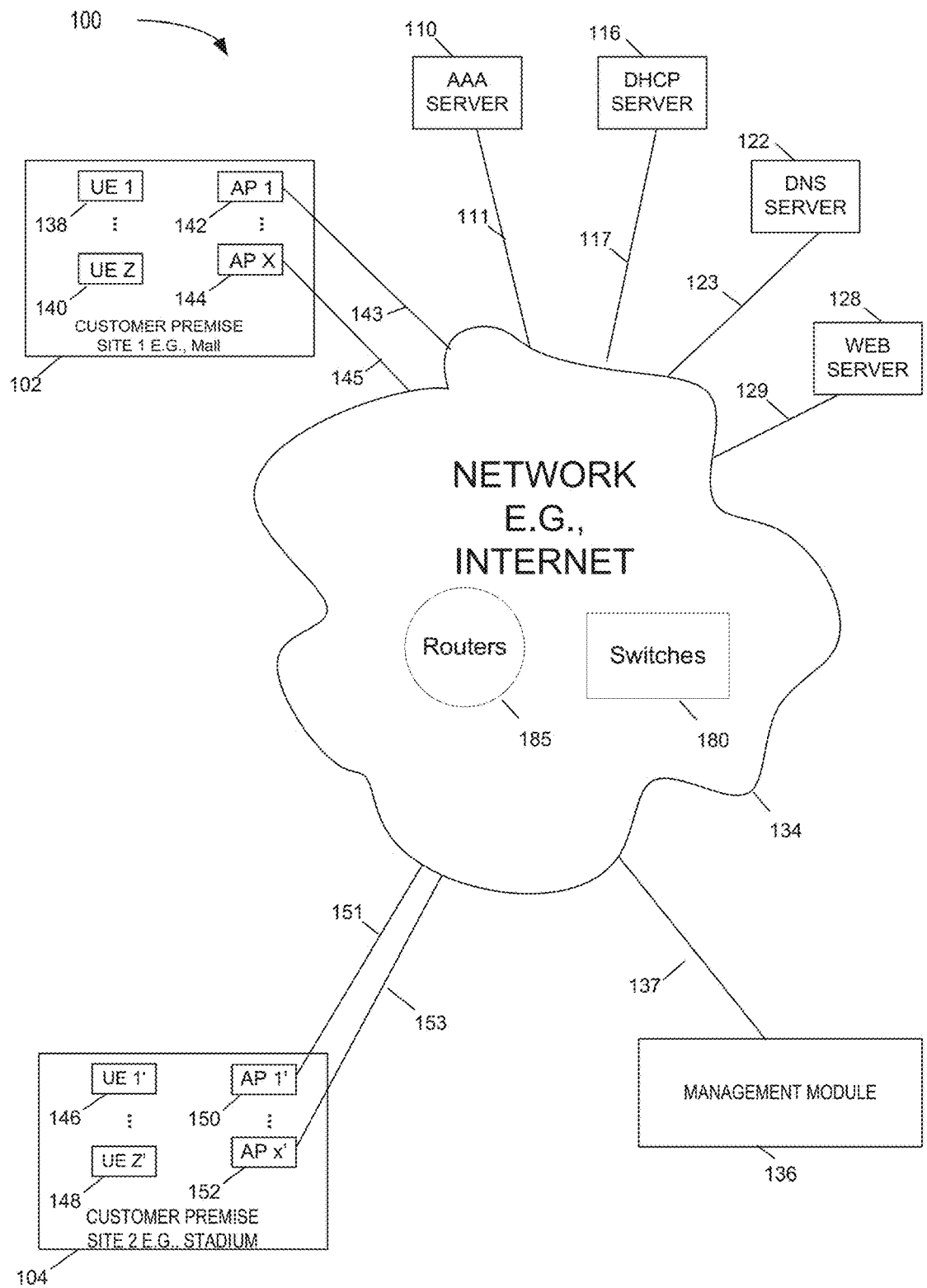
FIG. 1 is a drawing of an example system.

Disclosed are methods for determining whether a WT is instructed to roam from a first access point to a second access point. While traditional methods consider various signal strengths as experienced by a WT when determining whether the WT will roam, the disclosed embodiments take a more holistic approach and consider additional factors not necessarily visible to the individual WT.

The disclosed embodiments contemplate a network comprised of multiple access points under a form of central management. This central management is performed, in various embodiments, by a management module. The management module may include software and/or firmware instructions, which may be deployed to a single management device or may be distributed across multiple devices. As discussed further below, the management module is in communication with, and provides management functions for, a plurality of access points. Each of the plurality of access points is in communication with zero or more wireless terminals. A collection of access points managed by a common management module, along with wireless terminals associated with those access points, may be collectively referred to as a site within this disclosure.

The disclosed embodiments first develop a metric for each access point managed by the central management component. This first metric is referred to as an access point density. A process of calculating an AP density includes receiving, from each AP, RSSI values of signals it receives from other APs. These RSSI values of the signals received from APi by APj is denoted below as APi→APj.

Once the APi→APj is received by the management component, from its respective access points, for combinations of i and j, the disclosed embodiments characterize the received RSSI values. In some aspects, the characterization is provided via a determination of a median or average of the RSSI values. A standard deviation of the values may also be determined in some embodiments. One embodiment of this characterization is described below with respect to Equation 1:

$$\text{Average RSSI} = (\Sigma_{All\ I\ \&\ J\ combinations} APi \rightarrow APj)/n \quad (1)$$

where:
n—number of combinations of i and j resulting in RSSI measurement

An example standard deviation is calculated via Equation 2 below:

$$\delta = \sqrt[2]{\left(\frac{1}{n-1}\right)\left(\sum_i (RSSIi - Ave\ RSSI)**2\right)} \quad (2)$$

where:
δ standard deviation,
$RSSI_i$ ith RSSI from the n measured RSSIs,
n is a number of combinations of i and j resulting in RSSI measurement.
Ave RSSI average RSSI for APs managed by a single management component and calculated via Equation 1 above Some of the disclosed embodiments further determine a "contribution" of each RSSI value to the characterization. In some of these embodiments, the contribution is determined via Equation 3 below:

$$Wt_{i \to j}(RSSI_{i \to j}) = (RSSI_{i \to j} - Ave\ RSSI)/\delta \quad (3)$$

Where:
$Wt_{i \to j}$ ($RSSI_{i \to j}$) contribution of the RSSI received from $AP_i$ by $AP_j$ to the characterization (in this case, the average),
$RSSI_{i \to j}$ RSSI received from $AP_i$ by $AP_j$,
Ave RSSI average RSSI of APs managed by a management component (e.g. via Equation 1 above),
δ standard deviation (e.g. via Equation 2 above).

While Equation (3) above illustrates a determination of an average, in other embodiments, a median, an average, or any similar measurement may be used in characterization of the wireless network.

Some of the disclosed embodiments utilize the "contribution" values determined above to then determine a density metric for APs managed by the management component. For example, some embodiments utilize Equation 4 below to determine an AP density metric for each AP:

$$APi\ density = \Sigma_j Wt_{i \to j}(RSSI_{i \to j}) \quad (4)$$

where:
APi density density for the $i^{th}$ AP indicating cumulative contribution of the $i^{th}$ AP to the overall AP density of the APs included in the site or managed by a common management server,
j index of the $j^{th}$ AP which receives measurable RSSI from APi.

While the AP density metric described above relies on RSSI values determined at APs, some of the disclosed embodiments also consider RSSI values determined at WTs included in the network. To accomplish this, some embodiments communicate RSSI values determined by the WTs to APs associated with the WTs. Those APs then communicate the RSSI values to the management component.

In those embodiments, a WT measures the RSSI it observes from each AP and reports it to the management component. In some embodiments each of the RSSI values observed at a WT is classified into one of two classes (e.g. "High" and "Low"). In some embodiments, RSSI values below −72 dbm are classified as Low while other RSSI values are classified as "High." The specific classification threshold may vary by embodiment.

A Low RSSI is generally indicative of a WT that is relatively further away from the AP generating the signal while a High RSSI value is generally indicative of the WT being relatively closer to the AP. Some embodiments recognize that when the RSSI value of an AP is classified as low, existing roaming algorithms ensure that the WT would roam to any AP that exhibits stronger RSSI to the WT. Thus, in these embodiments, these WTs are not considered for a roaming determination using the AP density metrics described above.

For WTs observing relatively higher RSSI values from their associated APs (e.g. RSSI values classified as "High" above), the disclosed embodiments may consider an AP density value for the associated AP, as well as AP density values for any other APs which may be transition/roaming candidates for the WT.

Some embodiments may further include an RSSI threshold, denoted $RSSI_{Threshold}$. The $RSSI_{Threshold}$ (e.g. 6 dbm) represents a minimum difference between an associated AP RSSI value and a second AP's RSSI value. If the second AP does not meet the minimum difference, the AP density metrics are not considered for that second AP, and thus that second AP will not be a target AP for a new association for the respective WT. If the second AP does meet the minimum difference, some embodiments evaluate Equation 5 below:

$$RSSI_{2nd} - RSSI_{1st} > C_1\ AP_{1st}\ density + C_2\ AP_{2nd}\ density - C_3*(Num\ WC_{1st} - Num\ WC_{2nd}) \quad (5)$$

Where:
$RSSI_{1st}$ RSSI of signal from first AP,
$RSSI_{2nd}$ RSSI of signal from second AP,
C1, C2, and C3—coefficients (which may be set to constant values or dynamically determined via machine learning as described further below),
$AP_{1st}$ density—AP density for first AP (with which the WT is associated as calculated by Equation 4 above,
$AP_{2nd}$ density—AP density for a second AP as calculated by Equation 4,
Num $WC_{1st}$ a number of WTs associated with first AP,
Num $WC_{2nd}$ a number of WTs associated with second AP.

The equation above adds the two density metrics from the first AP and second AP to obtain a measure for density experienced by a WT in the neighborhood of the two referenced APs. For example, assume that the parameter $RSSI_{Threshold}$ is set to −72 dbm, and the measured $RSSI_{1st}$ (by the WT from the first AP with which the WT is associated) is −65 dbm. Given the RSSI value of the first AP is greater than the threshold, a local (WT initiated) mobility event is not triggered. However, the disclosed embodiments may instruct the WT to roam to another AP under some circumstances.

For example, in a hypothetical example assuming a $RSSI_{2nd}$ value of −60 dbm, $AP_{1st}$ density is 2.52, $AP_{2nd}$ density is 3.63, and the coefficients C1, C2, and C3 are set to 0.3. Further assuming that Num $WC_{1st}$ is 70 and Num $WC_{2nd}$ is 10, the left side of Equation 5 evaluates to −60−(−65)=5. Similarly, substituting the example numbers from above in the right side of the inequality of Equation 5, the right side evaluates to 0.3*2.52+0.3*3.63−0.3*(70−10)=−16.155. Thus, in this example, the inequality is satisfied. This is primarily due to the large difference between the number of clients associated with each AP. Under these circumstances, some of the disclosed embodiments instruct the WT to roam or transition to the second AP and disconnect or disassociate from the first AP. This instruction occurs despite the RSSI value of the first AP being relatively good. (e.g. above the transition threshold described above with respect to known methods).

If the inequality is not satisfied, no roaming instruction is generated. Thus, these embodiments provide a roaming instruction only if an improvement in observed RSSI is above a threshold. Per the example of Equation 5, the threshold depends on one or more of the density of the associated AP, the density of the candidate AP, and available capacity on one or more of the APs.

The discussion above described an embodiment wherein a second AP is considered as a potential roaming target only if the RSSI measured by the WT from a signal associated with the second AP exceeds by at least a threshold (e.g., 6 dbm) the RSSI associated with the AP with which the wireless terminal is currently associated.

In according with other embodiments rather than using a predetermined static threshold T2, (e.g., 6 dbm), the threshold is dynamically determined so as to reflect a wireless environment in which the WT operates. In one example embodiment, the dynamic threshold is determined by calculating differences $RSSI_{ith}-RSSI_{kth}$ between APs as measured by the all the WTs in the system. These embodiments then determine an average of these differences between AP RSSI values and set the dynamic threshold to the average. Thus, if the difference is above the average difference, the AP is considered as a potential roaming target, whereas if the difference is below the average difference, the AP is not considered as a potential roaming target. In accordance with another example embodiment, the system uses the median value (rather than the average) of the differences as the dynamic threshold T2. The dynamic threshold is periodically determined in some embodiments. In accordance with yet another example embodiment, the system calculates the value of $C_1$ $AP_{1st}$ density+C2 $AP_{2nd}$ density−C3*(Num $WC_{1st}$−Num $WC_{2nd}$) for pairs of APs that are visible to any WT. In accordance with one preferred embodiment, averages of these numbers are determined. The dynamic threshold (T2) is then set to the average value. Alternatively, in other embodiments, the median of the values (rather than the average) is used as the dynamic threshold T2.

In some embodiments, the evaluation of Equation 5 above is performed with respect to multiple APs visible to a specific WT. In these embodiments, Equation 5 is evaluated with respect to each of the multiple APs and an AP is selected that exhibits a largest difference between the left side and the right side of the equation. In some embodiments, differences in an RSSI value of an associated (e.g. current) AP (e.g. $RSSI_{1st}$), and an RSSI value of a candidate AP for a new association (e.g. $RSSI_{2nd}$) are evaluated for each candidate AP. Some embodiments evaluate the remaining portion of Equation 5 (e.g. the right side) only for those candidate APs where the difference is above a predetermined threshold value.

In some embodiments, after setting the initial values of the coefficients C1, C2 and C3 of Equation 5 to e.g., 0.3, machine learning is employed to adapt the coefficients C1, C2 and C3 so as to further improve performance of the wireless network. In some embodiments, the machine learning utilizes a gradient-descent algorithm.

To facilitate the adaptation of these parameters, a cost function is defined based on system parameters representing a system level experience (SLE) provided by the wireless network to a population of wireless terminals. To reduce dependency on any specific WT or any specific WT mobility within an area covered by the wireless network, some of the disclosed embodiments average SLE parameters over a time period, e.g., an hour, a day, or even a week, and aggregate SLEs reflecting an experience by a plurality of WTs serviced by the wireless network. Equation 6 below illustrates a non-limiting example of such cost function:

$$Cf = \Theta 1*(\text{Ave RSSI}(i) - \text{Ave RSSI}(i-1)) - \Theta 2*(\text{Ave Latency}(i) - \text{Ave Latency}(i-1)) - \Theta 3*(\text{Num Roaming}(i) - \text{Num Roaming}(i-1)) \quad (6)$$

Where:
Cf cost function used for adapting the C1, C2, and C3 coefficients,
$\Theta 1$, $\Theta 2$, and $\Theta 3$ coefficients indicative of the relative importance of the various
SLE indicators,
Ave RSSI(i)—Average RSSI from all WTs over a time period i,
Ave RSSI(i−1)—Average RSSI from all WTs over a time period i−1,
Ave Latency(i)—Average latency from all WTs over a time period i,
Ave Latency(i−1)—Average latency from all WTs over a time period i−1,
Num Roaming(i)—Number of roaming by all WTs over a time period i,
Num Roaming(i−1)—Number of roaming by all WTs over a time period i−1.

While Equation 6 above illustrates a cost function based on three SLE parameters, namely average RSSI, average latency, and average roaming success, some embodiments use other SLE indicators and the disclosed embodiments are not in any way limited to these examples.

Equation 7 below represents one embodiment of an equation to modify the coefficients:

$$C_1(i+1) = C_1(i) + \alpha*(Cf(i) - Cf(i-1))*AP_{1st} \text{ density}$$

$$C_2(i+1) = C_2(i) + \alpha*(Cf(i) - Cf(i-1))*AP_{2nd} \text{ density}$$

$$C_3(i+1) = C_3(i) + \alpha*(Cf(i) - Cf(i-1))*(\text{Num } WC_{1st} - \text{Num } WC_{2nd}) \quad (7)$$

Where:
$C_1(i+1)$—coefficient $C_1$ to be used in Equation 5 in next time period,
$C_2(i+1)$—coefficient $C_2$ to be used in Equation 5 in next time period,
$C_3(i+1)$—coefficient $C_3$ to be used in Equation 5 in next time period,
$C_1(i)$—coefficient $C_1$ used in Equation 5 in current time period,
$C_2(i)$—coefficient $C_2$ used in Equation 5 in current time period,
$C_3(i)$—coefficient $C_3$ used in Equation 5 in current time period,
$\alpha$—adaptation parameter used to determine speed of adaptation,
Cf(i)—cost function evaluated in current time period,
Cf(i−1)—cost function evaluated in previous time period.
$AP_{1st}$ density—AP density for first AP (associated with WT in Equation 4 above,
$AP_{2nd}$ density—AP density for a second AP as calculated by Equation 4 (a potential target AP for switching by the WT),
Num $WC_{1st}$ a number of WTs associated with the first AP,
Num $WC_{2nd}$ a number of WTs associated with the second AP.

Other embodiments employ machine learning algorithms to determine the set of coefficients C1, C2, and C3 that result in minimizing the cost function such as the cost function described in equation 6.

FIG. 1 is a drawing of an example system 100 implemented in accordance with an example embodiment.

Example system 100 includes a plurality of access points (AP1 142, ..., AP X 144, AP 1' 150, ..., AP X' 152). An access point can take the form of a wireless access point a router, a switch, or any other device capable of providing network access. The system 100 optionally includes one or more Authentication, Authorization and Accounting (AAA) servers (only one AAA server 110 is shown), a one or more of Dynamic Host Configuration Protocol (DHCP) servers (only one DHCP server 116 is shown), one or more Domain Name System (DNS) servers (only one DNS server 122 is shown), one or more Web servers (only one Web server 128 is shown). The system also includes a management module 136. The management module 136 represents a set of instructions that configure hardware processing circuitry to perform functions attributed to the module 136. In some aspects, the management module 136 executed on a management server, such as the management server 706 discussed below with respect to FIG. 7. In some aspects, the management module 136 is distributed or accessible to multiple physical devices, with the functions performed by the management module also distributed to those multiple physical devices (e.g. a cloud-based implementation).

These components communication via network 134, e.g., the Internet and/or an enterprise intranet. The network 134 consists of numerous routers 185 and numerous switches 180. Network communications links (143, 145, 171, 173) couple the access points (AP1 142, AP X 144, AP 1' 150, AP X' 152) respectively, to network 134. Network communications link 111 couple one or more AAA server(s). Network communications link 117 couple the one or more DHCP servers (DHCP server 116 shown) to network 134. Network communications link 123 couple one or more DNS servers (DNS server 122 shown) to network 134. Network communications link 129 couple the Web servers (only one Web server 128 is shown) to network 134. Example system 100 further includes a plurality of user equipment devices (UE 1 138, ..., UE Z 140, UE 1' 146, ..., UEZ' 148) wherein user equipment is any wired, wireless, or optical equipment providing network access to communication devices used by users such as people or automated devices such as IoT devices. Some of the UEs (138, 140, 146, 148) are wireless devices which may move throughout system 100.

In example system 100 sets of access points are located at different customer premise site. Customer premise site 1 102, e.g., a mall, includes access points (AP 1 142, ..., AP X 144). Customer premise site 2 104, e.g., a stadium, includes access points (AP 1' 150, ..., AP X' 152). As shown in FIG. 1, UEs (UE 1 138, ..., UE Z 140) are currently located at customer premise site 1 102; UEs (UE 1' 146, ..., UE Z' 148) are currently located at customer premise site 2 104. In some embodiments, one or more of the servers, routers, switches, APs, UEs NMS, and other servers attached to the network includes a system log or an error log module. The system log and/or error log module records the status of the device including normal operational status and error conditions.

Figure 2:
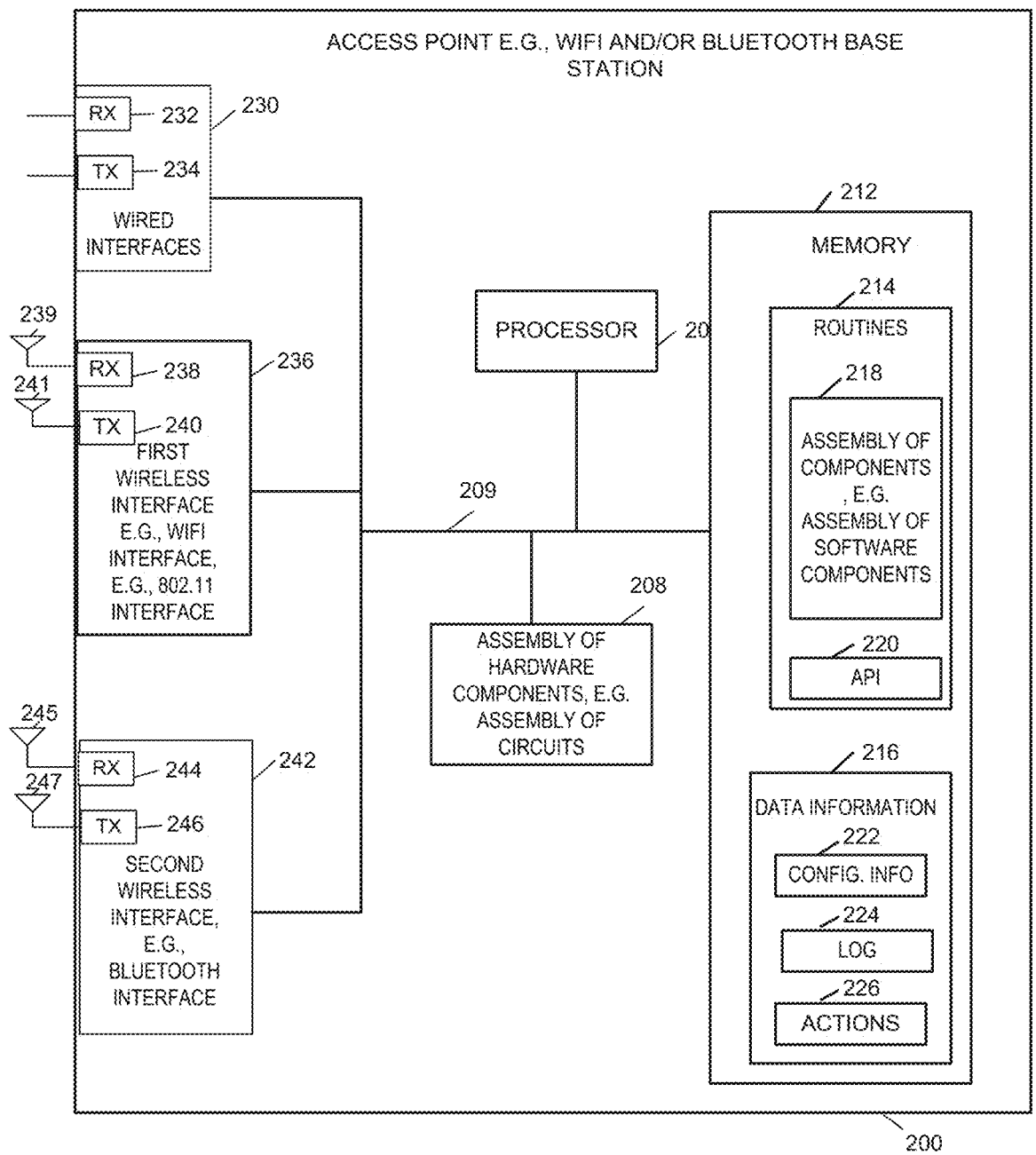
FIG. 2 is a drawing of an example access point.

FIG. 2 is a drawing of an example access point 200 (e.g., any one or more of access points AP 1 142, ..., APX 144, AP 1' 150, ..., APX' 152) in accordance with an example embodiment. Access point 200 includes wired interface 230, wireless interfaces 236, 242, a processor 206, e.g., a CPU, a memory 212, and an assembly of components 208, e.g., assembly of hardware components, e.g., assembly of circuits, coupled together via a bus 209 over which the various elements may interchange data and information. Wired interface 230 includes receiver 232 and transmitter 234. The wired interface couples the access point 200 to a network and/or the Internet 134 of FIG. 1. First wireless interface 236, e.g., a wireless a Wi-Fi interface, e.g. 802.11 interface, includes receiver 238 coupled to receive antenna 239, via which the access point may receive wireless signals from communications devices, e.g., wireless terminals, and transmitter 240 coupled to transmit antenna 241 via which the access point may transmit wireless signals to communications devices, e.g., wireless terminals. Second wireless interface 242, e.g., a Bluetooth interface, includes receiver 244 coupled to receive antenna 245, via which the access point may receive wireless signals from communications devices, e.g., wireless terminals, and transmitter 246 coupled to transmit antenna 247 via which the access point may transmit wireless signals to communications devices, e.g., wireless terminals.

Memory 212 includes routines 214 and data/information 216. Routines 214 include assembly of components 218, e.g., an assembly of software components, and Application Programming Interface (API) 220. Data/information 216 includes configuration information 222, device status log including error events and normal events captured as messages in a system log or an error log 224 and collection of remedial actions 226 to be taken in case of discovery of abnormal message flows.

Figure 3:
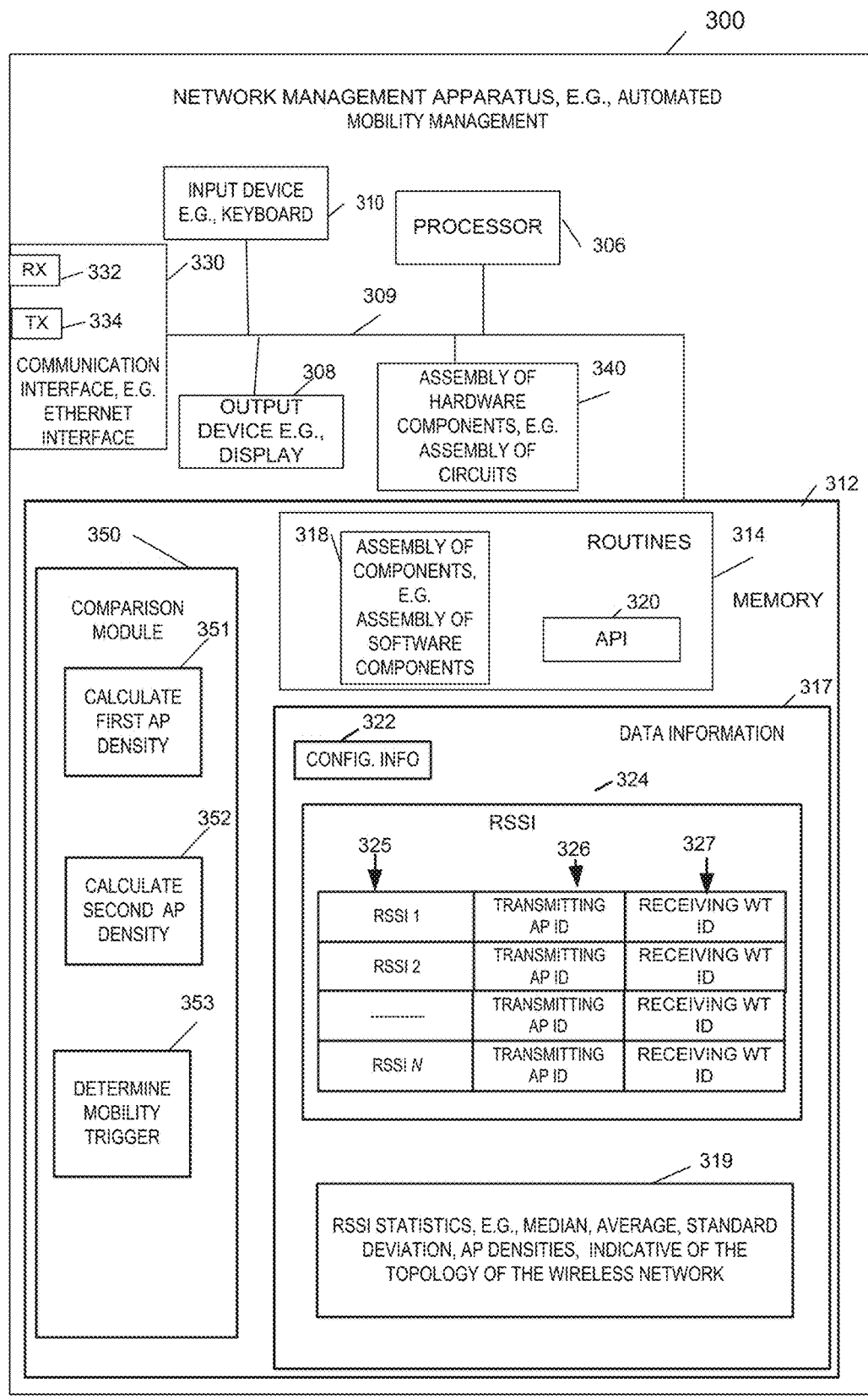
FIG. 3 is a block diagram of an example network management apparatus.

FIG. 3 is a block diagram of an example network management apparatus 300 in accordance with one or more of the disclosed embodiments. In some embodiments, network management apparatus 300 of FIG. 3 executes the management module 136 of FIG. 1.

Network management apparatus 300 includes a communications interface 330, a processor 306, an output device 308, e.g., display, printer, etc., an input device 310, e.g., keyboard, keypad, touch screen, mouse, etc., a memory 312 and an assembly of components 340, e.g., assembly of hardware components, e.g., assembly of circuits, coupled together via a bus 309 over which the various elements may interchange data and information. The communications interface 330 includes an Ethernet interface in some embodiments. Communications interface 330 couples the network monitoring system 300 to a network and/or the Internet. Communications interface 330 includes a receiver 332 via which the network monitoring apparatus can receive data and information, e.g., including RSSI related information, e.g., RSSI of signals received by APs from their neighboring APs, and a transmitter 334, via which the network monitoring apparatus 300 can send data and information, e.g., including configuration information and instructions, e.g., information to WTs regarding the network density contributed by each one of the access points, etc.

Memory 312 includes routines 314 and data/information 317. Routines 314 include assembly of components 318, e.g., an assembly of software components, and Application Programming Interface (API) 320. Data/information 317 includes configuration information 322 including a site specific parameter $RSSI_{threshold}$, RSSIs received from APs 324 including a table containing each specific RSSI 325, the ID of the transmitting AP 326, and the ID of the receiving WT 327. In according with another embodiment, the table 324 includes the RSSIs received by each AP from its neighboring APs (not shown). The memory 312 also includes RSSI statistics such as median, average and standard deviation, and AP densities indicative of the topology of the wireless network 319.

The memory 312 also includes comparison module 350 for determining based on the wireless network topology whether the WT should be instructed to invoke mobility, disassociate from the first AP and associate with the second AP. Comparison module includes a method for calculating first AP density 351, a method for calculating second AP density 352, and a method for determining whether the WT should invoke mobility, disassociate itself from first AP and associate with the second AP, 353.

Figure 4:
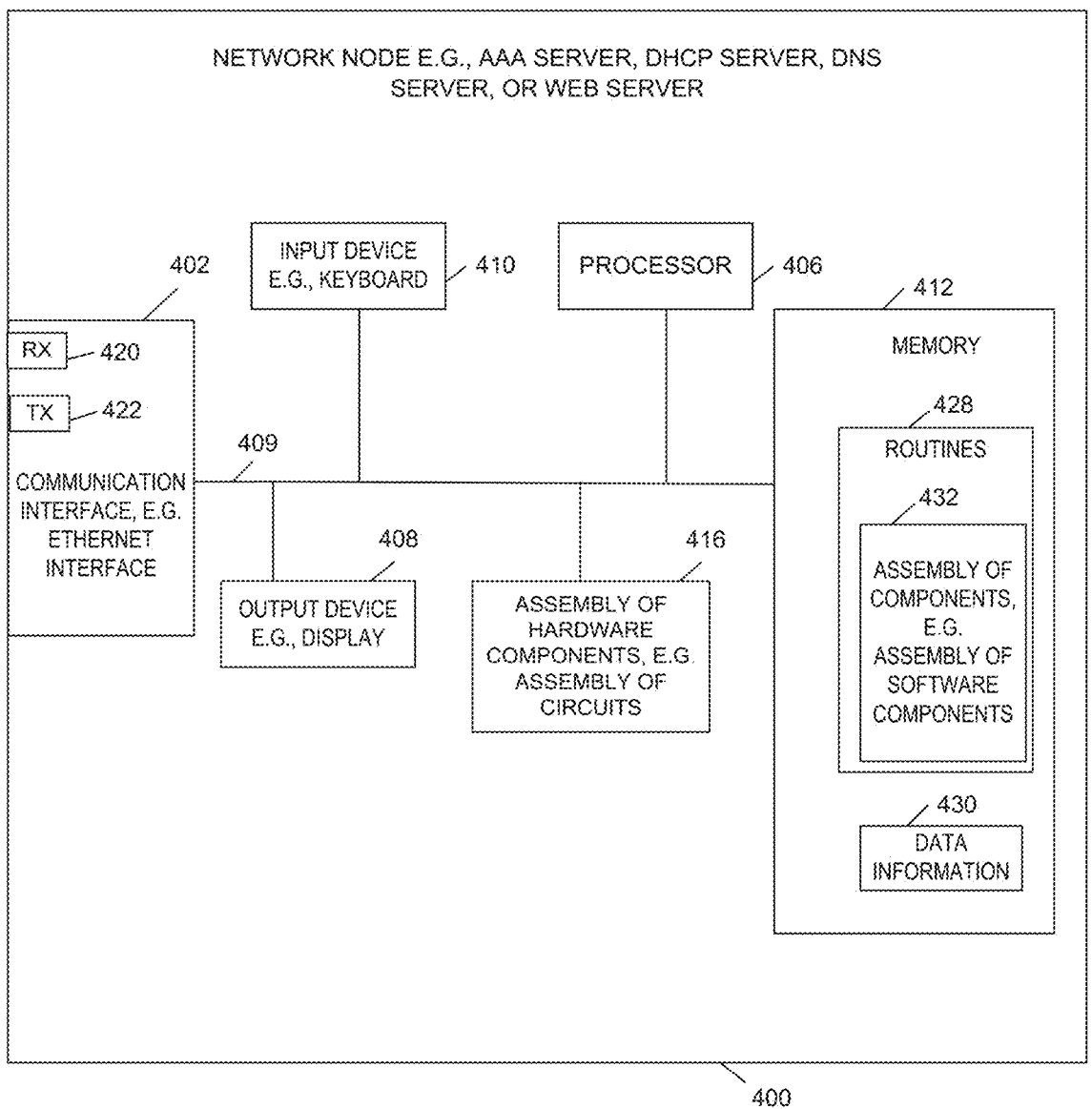
FIG. 4 is a drawing of an example network node

FIG. 4 is a drawing of an example network node 400, e.g. a device or a server attached to network 134, e.g., router, switch, AAA server, DHCP server, DNS server, Web server, etc., or a network devices such as, e.g., routers 185, switches 180, etc. In some embodiments, network node 400 of FIG. 4 is server 110, 116, 122, 128, of FIG. 1 or routers 185, switches 180 of FIG. 1. Network node 400, e.g. a server, includes a communications interface 402, e.g., an Ethernet interface, a processor 406, an output device 408, e.g., display, printer, etc., an input device 410, e.g., keyboard, keypad, touch screen, mouse, etc., a memory 412 and an assembly of components 416, e.g., assembly of hardware module, e.g., assembly of circuits, coupled together via a bus 409 over which the various elements may interchange data and information. Communications interface 402 couples the network node 400 to a network and/or the Internet. Though only one interface is shown, those skilled in the art should recognize that routers and switches may, and usually do, have multiple communication interfaces. Communications interface 402 includes a receiver 420 via which the network node 400, e.g. a server, can receive data and information, e.g., including operation related information, e.g., registration request, AAA services, DHCP requests, Simple Notification Service (SNS) look-ups, and Web page requests, and a transmitter 422, via which the network node 400, e.g., a server, can send data and information, e.g., including configuration information, authentication information, web page data, etc.

Memory 412 includes routines 428 and data/information 430. Routines 428 include assembly of components 432, e.g., an assembly of software components and data information 430. Data information 430 includes system log and/or error log.

Figure 5:
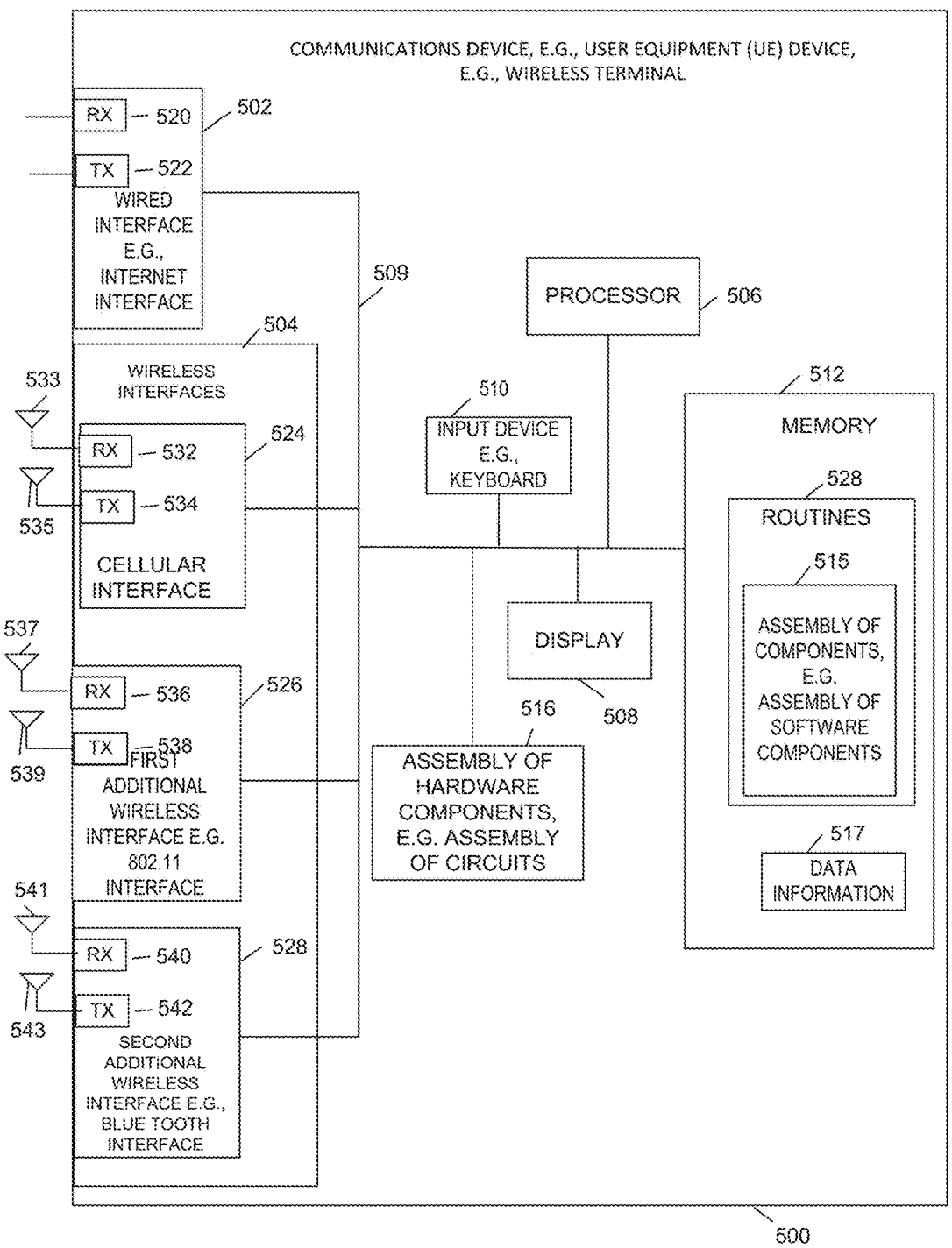
FIG. 5 is a drawing of an example communications device.

FIG. 5 is a drawing of an example communications device 500, e.g. a wireless terminal (WT), a user equipment (UE) device (e.g., user equipment UE 1 138, . . . , UE Z 140, UE 1' 146, . . . , UE Z' 148) in accordance with an example embodiment. Communications device 500, e.g., a UE, includes wired interfaces 502, wireless interfaces 504, a processor 506, e.g., a CPU, a memory 512, and an assembly of components 516, e.g., assembly of hardware module, e.g., assembly of circuits, coupled together via a bus 509 over which the various elements may interchange data and information. Wired interface 502 includes receiver 520 and transmitter 522. The wired interface 502 couples the communications device 500, e.g. a UE, to a network and/or the Internet 134 of FIG. 1.

The wireless interface 504 includes cellular interface 524, first additional wireless interface 526, e.g., 802.11 Wi-Fi interface, and a second additional wireless interface 528, e.g., Bluetooth interface. The cellular interface 524 includes a receiver 532 coupled to receiver antenna 533 via which the communications device 500, e.g. UE, may receive wireless signals from access points, e.g., AP 1 142, . . . , APX 144, AP 1' 150, . . . , APX' 152, and transmitter 534 coupled to transmit antenna 535 via which the communications device 500, e.g. UE, may transmit wireless signals to APs, e.g., AP 1 142, . . . , APX 144, AP 1' 150, . . . , APX' 152. First additional wireless interface 526, e.g., a Wi-Fi interface, e.g. 802.11 interface, includes receiver 536 coupled to receive antenna 537, via which the communications device 500, e.g., UE, may receive wireless signals from communications devices, e.g., APs, and transmitter 538 coupled to transmit antenna 539 via which the communications device 500, e.g., UE, may transmit wireless signals to communications devices, e.g., APs. Second additional wireless interface 528, e.g., a Bluetooth interface, includes receiver 540 coupled to receive antenna 541, via which the communications device 500, e.g. a UE, may receive wireless signals from communications devices, e.g., APs, and transmitter 542 coupled to transmit antenna 543 via which the communications device 500, e.g., a UE, may transmit wireless signals to communications devices, e.g., APs.

Memory 512 includes routines 528 and data/information 517. Routines 528 include assembly of components 515, e.g., an assembly of software components. Data/information 517 may include configuration information as well as any additional information required for normal operations of UE 500. Data information includes also system log or error log.

Figure 6:
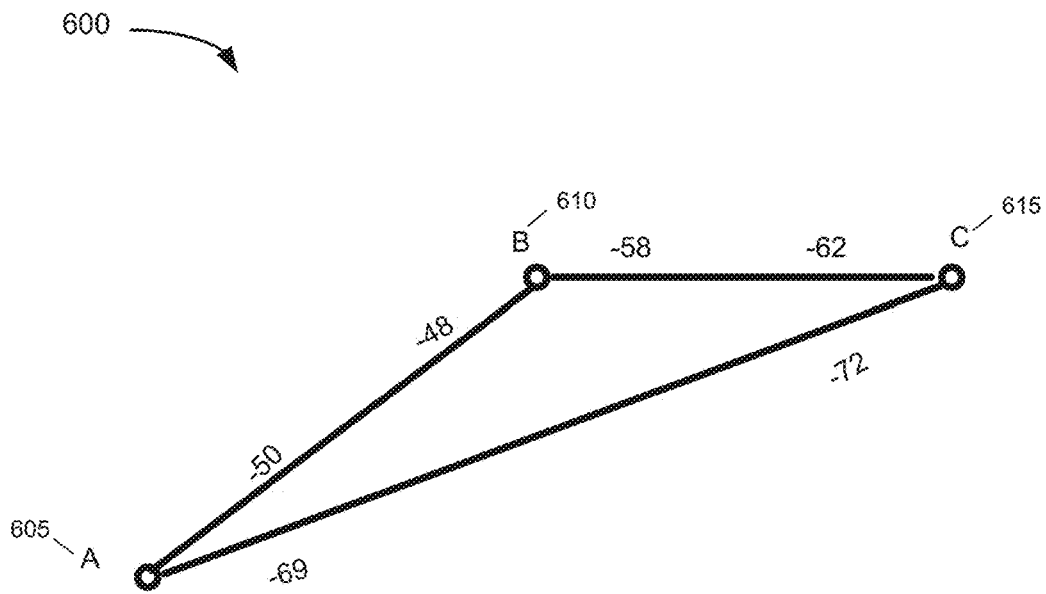
FIG. 6 shows an example wireless network.
Figure 6:
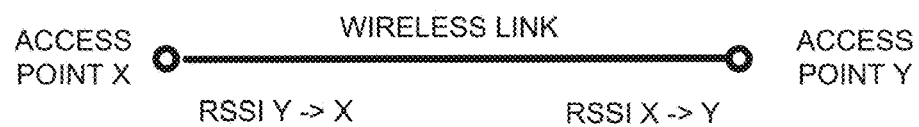

FIG. 6 shows an example wireless network 600. The network includes 3 APs, AP A 605, AP B 610, and AP C 615, and 3 wireless links over which the respective RSSIs are (−58,−62), (−50, −48), (−69, −72). As explained above each AP forwards these RSSI measurements to the management module 136.

As explained above, in some embodiments, the management module 136 applies Equations 1 through 4 to determine parameters that reflect the topology of the specific wireless network. Specifically, using the RSSI measurements illustrated in FIG. 6, the method determines the median to be −60, the average RSSI to be −59.833, δ to be 9.77.

Applying Equation 3 above provides:

$$Wt_{A \to B}(RSSI_{A \to B}) = (RSSI_{A \to B} - \text{Ave RSSI})/\delta = (-48 - (-59.833))/9.77 = 1.211$$

$$Wt_{B \to A}(RSSI_{B \to A}) = (RSSI_{B \to A} - \text{Ave RSSI})/\delta = (-50 - (-59.833))/9.77 = 1.006$$

$$Wt_{A \to C}(RSSI_{A \to C}) = (RSSI_{A \to C} - \text{Ave RSSI})/\delta = (-72 - (-59.833))/9.77 = 1.211$$

$$Wt_{C \to A}(RSSI_{C \to A}) = (RSSI_{C \to A} - \text{Ave RSSI})/\delta = (-48 - (-59.833))/9.77 = 1.245$$

$$Wt_{C \to B}(RSSI_{C \to B}) = (RSSI_{C \to B} - \text{Ave RSSI})/\delta = (-58 - (-59.833))/9.77 = 0.188$$

$$Wt_{B \to C}(RSSI_{B \to C}) = (RSSI_{B \to C} - \text{Ave RSSI})/\delta = (-62 - (-59.833))/9.77 = 0.221$$

As the results above demonstrate, as AP densities of the associated first and second APs increase, the threshold for triggering the roaming between the first and second APs also increases.

Figure 7:
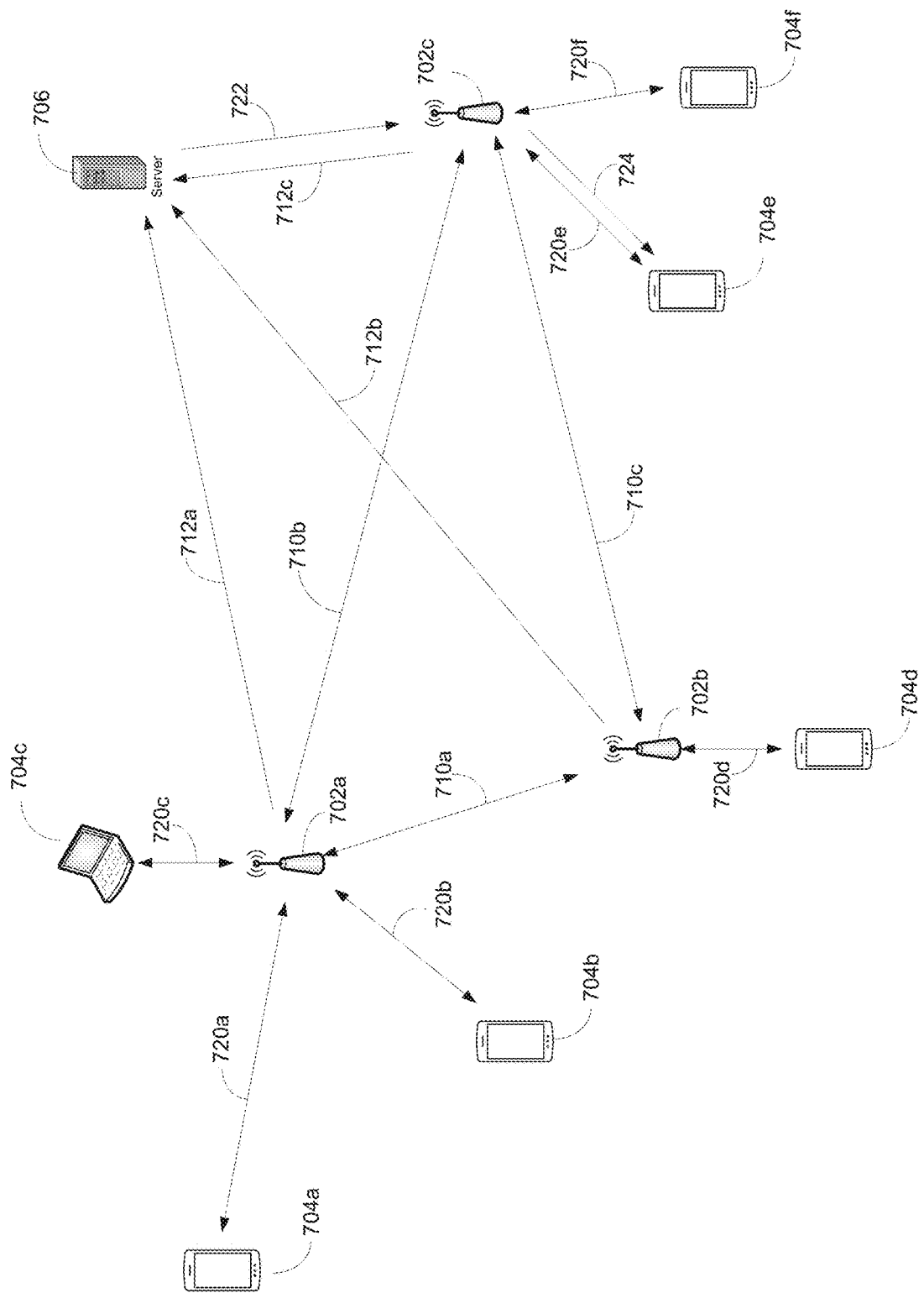
FIG. 7 is an overview diagram showing communication between wireless terminals, access points, and a management server in at least some of the disclosed embodiments.

FIG. 7 is an overview diagram showing communication between wireless terminals, access points, and a management server in at least some of the disclosed embodiments. FIG. 7 shows three access points 702a-c. In various embodiments, any one or more of the access points 702a-c are equivalent to any of the APs 142, and/or 144. Separately, in various other embodiments, any one or more of the access points 702a-c are equivalent to any of the APs 150 and 152, discussed above with respect to FIG. 1. Each of the APs 702a-c is associated with at least one wireless terminal. FIG. 7 shows AP 702a in association with wireless terminals 704a-c. AP 702b is associated with wireless terminal 704d. AP 702c is associated with wireless terminals 704e-f. Each of the APs 702a-c are in communication with a management server 706. The management server 706 may execute instructions included in the management module 136 discussed above with respect to FIG. 1.

The disclosed embodiments share measurements of communication performance to improve roaming of the wireless terminals. To that end, each of the APs 702*a-c* determine an RSSI measurement based on one or more signals received from other access points. For example, as shown in FIG. 7, AP 702*a* receives signals 710*a* from the AP 702*b*. AP 702*a* also receives signals 710*b* from the AP 702*c*. Based on these signals, the AP 702*a* determines an RSSI value to associate with each of the APs 702*b* and AP 702*c*. The AP 702*a* then transmits these RSSI values via communication flow 712*a* to the management server 706. Each of the APs 702*b* and 702*c* operate in a similar manner. AP 702*b* measures RSSI of signals received from the AP 702*a* and separately the AP 702*c*. These measurements are transmitted to the management server 706 via communication flow 712*b*. AP 702*c* determines RSSI values of signals received from each of the APs 702*a* and 702*b* via communication flows 710*b* and 710*c* respectively. This information is transmitted to the management server 706 via communication flow 712*c*.

Upon receiving the RSSI measurements from each of the APs 702*a-c*, in some embodiments, the management server determines an average and standard deviation of the RSSI measurements. The management server 706 then determines a contribution of each AP 702*a-c* to the average. As described above with respect to Equation 3, the contribution is obtained by subtracting the average RSSI value from each individual RSSI value provided by a particular AP. The resulting difference is normalized by the standard deviation to obtain a contribution of the individual RSSI value. All of the individual RSSI values from the particular AP are then aggregated (e.g. via Equation 4) to determine a density metric for the particular AP.

FIG. 7 also shows each wireless terminal 704*a-f* communicating RSSI measurement values to its respective associated AP via the communication flows 720*a-f*. The RSSI measurements provided by each of the wireless terminals 704*a-f* indicate RSSI values of signals received from access points in the vicinity of the particular wireless terminal (e.g. within wireless signal detection range). Thus, for example, in some embodiments, the wireless terminal 704*a* provides RSSI measurements of signals received from the AP 702*a*, but may not provide RSSI measurements of signals from the AP 702*c* if the AP 702*c*'s signals are too attenuated upon reaching the wireless terminal 704*a*. The wireless terminal 704*e* provides RSSI measurements for signals received from the AP 702*b* and the AP 702*c*, since both of those APs are within radio reception range of the wireless terminal 704*e*, at least in this example embodiment. Upon receiving the RSSI measurement values from their respective associated wireless terminals, each of the APs 702*a-c* forwards those RSSI values to the management server 706.

Upon receiving the RSSI measurements, the management server 706 evaluates the RSSI measurements according to Equation 5, discussed above, with respect to the RSSI measurements received from each of the wireless terminals. If the management server 706 determines that the inequality of Equation 5 is satisfied, it instructs the respective wireless terminal to transition or roam from a first AP (e,g, having $RSSI_{1st}$ according to Equation 5) to a second AP (e.g. having the $RSSI_{2nd}$ according to Equation 5). This instruction is conveyed by the management server 706 via the AP. Thus, for example, if the wireless terminal 704*e* is instructed to transition from the AP 702*c* to the AP 702*b*, the management server 706 sends an instruction message 722 to the AP 702*c*, which forwards the instruction via message 724 to the wireless terminal 704*e*. The wireless terminal 704*e* then attempts to associate with the AP 702*b* in accordance with the message 724.

Note that while FIG. 7 illustrates how the wireless terminal 704*e* is instructed to transition from AP 702*c* to AP 702*b*, one of skill should recognize that the disclosed embodiments operate such that a wireless terminal associated with any of the APs shown in FIG. 7 (e.g. any of 702*a-c*) may be similarly instructed by the server 706.

Figure 8:
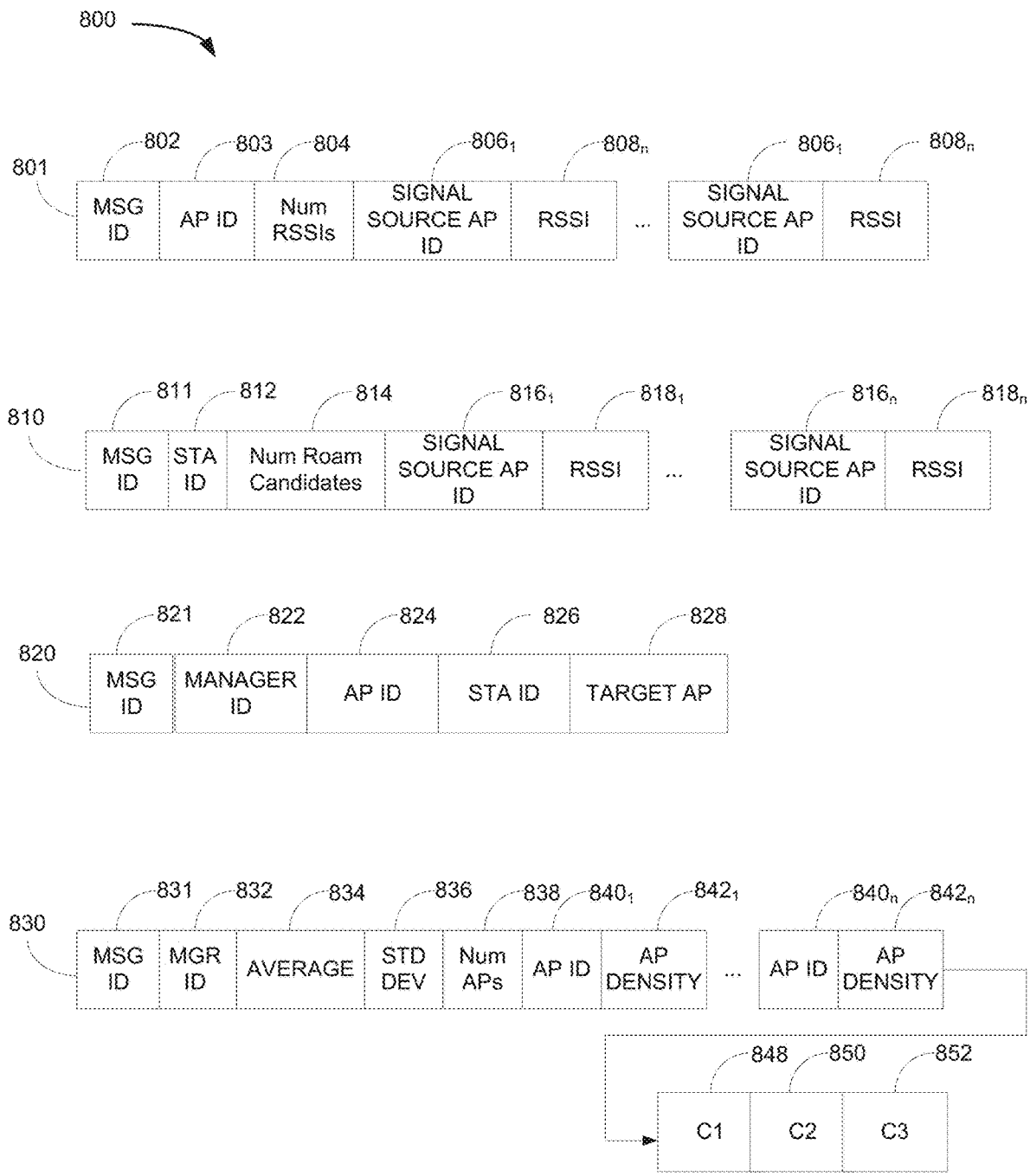
FIG. 8 shows example message formats that may be implemented in one or more of the disclosed embodiments.

FIG. 8 shows example message formats that may be implemented in one or more of the disclosed embodiments. While FIG. 8 shows example message portions, it should be understood that the disclosed embodiments may transmit a message including one or more of the fields described below. Furthermore, the fields may be arranged in a different order or include intervening fields between any of the fields discussed below with respect to the example message format.

Example message portion 801 includes a message identifier field 802, access point identifier field 803, and a number of RSSI measurements field 804. The message identifier field 802 identifies a format of the message portion 801. The access point identifier field 803 uniquely identifies an access point transmitting the message portion 801. In some embodiments, the access point identifier is a station address of the respective AP. Thus, the AP identifier field 803 identifies which AP obtained the RSSI measurements included in the message portion 801. The number of RSSI measurements field 804 defines a number of one or more pairs of fields indicating an access point identifier $806_1 \ldots n$ for source(s) of a signal measured to generate an RSSI measurement stored in field(s) $808_1 \ldots n$. In some embodiments, the example message portion 801 is transmitted from an access point (e.g. any of 702*a-c*) to a management server (e.g. 706). As explained above with respect to FIG. 7, each of the access points 702*a-c* transmit RSSI measurements of signals received from other access points via communication flows 712*a-c* respectively. Upon receiving example message portion(s) 801 from one or more access points, a management server (e.g. 706) may determine an average and standard deviation of the RSSI measurements.

Example message portion 810 includes a message identifier field 811, station identifier field 812, and a number of AP roaming candidates field 814. The message identifier field 811 identifies a format of the message portion 810. The station identifier field 812 uniquely identifies a station or wireless terminal. In some embodiments, the station identifier field 812 may store an association identifier of the station (obtained from an AP during an association request/response communication). The number of AP roaming candidates field 814 indicates a number of pairs of data that follow the field 814. Each of the pairs includes an AP identifier field 816 and an RSSI field 818. The AP identifier field 816 identifies a source AP that generates signals that resulted in RSSI measurements indicated by the RSSI field 818. Thus, the example message portion 810 provides for communication of RSSI information measured by a wireless terminal. The RSSI information indicates RSSIs for APs "visible" to the wireless terminal transmitting the example message portion 810. Thus, as discussed above with respect to FIG. 7, in an example embodiment, the wireless terminal 704*e* transmits the message portion 810 indicating RSSI of signals received from AP 702*c* and separate RSSI information of the AP 702*b*. RSSI information for AP 702*a* may or may not be included in the message in the example embodiment depending on the strength of signals generated by the AP 702*a* when reaching the wireless terminal 704*e*.

Example message portion 820 functions to instruct a particular wireless terminal or station to roam or transition from a first AP to which the station is currently associated to a different second AP. The example message portion 820 includes a message identifier field 821, manager identifier field 822, access point identifier field 824, station identifier field 826, and a target AP field 828. The message identifier field 821 identifies the format of the message portion 820. The manager identifier field 822 uniquely identifies a particular management server (e.g. 706). In some aspects, the manager identifier field 822 stores a station address of a management server. The AP identifier field 824 stores an identifier for an access point. In some aspects, the AP identifier field 824 stores a station address of the identified access point. The AP identifier field 824 identifies an access point associated with a station identified by the station identifier field 826.

The station identifier 826 stores a unique identifier of a station or wireless terminal (e.g. any of 704*a-f*). The target access point field 828 stores an identifier of an access point, such as a station address of the target access point. The target access point field 828 identifies an AP to which a station (identified by the station identifier field 826) is instructed, by the management server (identified via field 822) to roam or transition. The example message portion 820 is transmitted, in some embodiments, from the management server 706 to an access point (e.g. identified via field 824) associated with the identified station (via field 826). Upon receiving the example message portion 820, the AP forwards the message to the identified station (or the WT). Upon receiving the message portion 820, the station initiates a transition from its currently associated AP to the AP identified by the target AP field 828.

The message portion 830 is an example message that can function, in some embodiments, to distribute metrics computed by the management server 706 to access points and/or wireless terminals in some of the disclosed embodiments. For example, while in some of the disclosed embodiments, the management server 706 determines when a wireless terminal transitions and to which AP the wireless terminal transitions to, in other embodiments, this decision is made by the associated access point or, in other embodiments, by the wireless terminal itself. To support decision making and any of these devices, some metrics determined by the management server 706 are communicated to APs and/or wireless terminals to support decision making at that level. Example message portion 830 provides for such distribution of information.

The example message portion 830 includes a message identifier field 831, manager id field 832, average field 834, standard deviation field 836, and a number of APs field 838. The message identifier field 831 identifies a format of the message portion 830. The manager identifier field 832 identifies a management server (e.g. 706). For example, the manager id field 832 may store a station address of the management server in some embodiments. The average field 834 stores an average RSSI value for access point signals. (In an alternative embodiment, a median is provided either instead or in addition to the average.) For example, as discussed above with respect to Equation 1, at least some of the disclosed embodiments determine an average of RSSI values for signals received by an access point for signals transmitted by a different access point. The standard deviation field 836 stores or carries a standard deviation of those same RSSI measurements (e.g. via Equation 2 discussed above). The number of APs field 838 defines a number of field pairs that follow. Each field pair includes an AP identifier field 840 and AP density field 842. The AP identifier field 840 identifies an access point. In some aspects, the AP identifier field 840 stores a station address of the identified access point. The AP density field 842 stores a density metric for the identified access point. For example, the density field 842 may store or carry a value resulting from Equation 4, discussed above in some embodiments. After the pairs of AP ID, and AP density field $842_1 \ldots n$ and $844_1 \ldots n$, the example message format 830 includes three coefficient fields 848, 850, and 852. Each of these fields stores one of the coefficients discussed above, for example, with respect to Equation 5. One or more of the disclosed embodiments may encode and/or transmit, or receive and decode one or more of the fields discussed above with any of the example message formats 810, 820, and/or 830.

Figure 9:
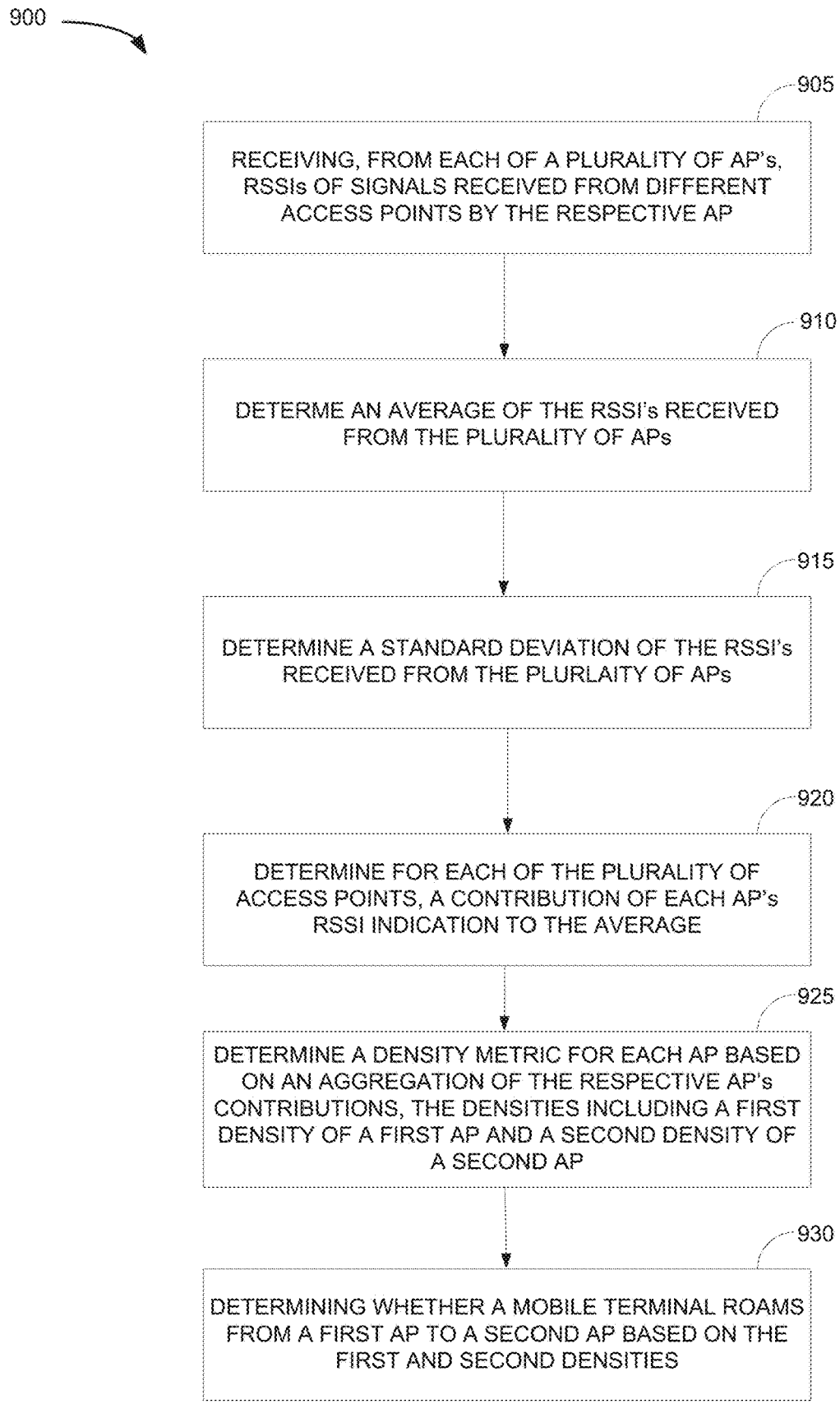
FIG. 9 is a flowchart of a process for determining whether to instruct a wireless terminal to roam from a first access point to a second access point.

FIG. 9 is a flowchart of a process for determining whether to instruct a wireless terminal to roam from a first access point to a second access point. In some aspects, one or more of the functions discussed below with respect to FIG. 9 are performed by hardware processing circuitry. For example, instructions stored in an electronic memory configure the hardware processing circuitry to perform one or more of the operation discussed below. In some embodiments, one or more of the functions discussed below are performed by the management server 706. A device performing the functions discussed below with respect to FIG. 9 may be referred to as an "executing device."

In operation 905, first RSSI information is received from a plurality of access points. In some embodiments, each access point managed by a single management server 706 determines an RSSI of signals received from another access point (also managed by the management server 706). These RSSI measurements are transmitted to the executing device. The executing device receives these RSSI measurements as the first RSSI information. As illustrated above with respect to FIG. 7, each of the access points 702*a-c* transmit RSSI information of signals received from the other access points to the management server 706 via communication flows 712*a-c*. The communication flows 712*a-c* thus collectively include the first RSSI information received in operation 905.

In operation 910, an average of the RSSIs received in operation 905 (and included in the first RSSI information) is determined. For example, the average determined in operation 910 is determined, in some embodiments, via Equation 1 discussed above.

In operation 915, a standard deviation of the RSSIs (included in the first RSSI information) received in operation 905 is determined. In some embodiments, the standard deviation determined in operation 915 is determined via Equation 2, discussed above.

In operation 920, a contribution of each RSSI value is determined. To determine the contribution, the average determined in operation 910 is subtracted from each AP's RSSI value. The resulting difference is then divided by the standard deviation determined in operation 915 to determine the contribution of the particular RSSI measurement. In some embodiments, operation 920 determines the contributions according to Equation 3, discussed above.

In operation 925, a density measurement or metric is determined for each access point. The density is determined by aggregating the contributions of each RSSI value for signals received from a particular access point. In some embodiments, operation 925 determines the AP densities according to Equation 4, discussed above. The density metrics computed in operation 925 include a first density of a first AP of the plurality of APs and a second density of the second AP of the plurality of APs.

In operation 930, a determination is made of whether a wireless terminal roams from the first AP to the second AP based, at least in part, on the first density and the second density. In some aspects, the determination is made according to Equation 5 discussed above. Some embodiments of operation 930 receive second RSSI information from the wireless terminal. In some embodiments, this second RSSI information is received indirectly, for example, via an AP to which the wireless terminal is associated. Thus, the first RSSI information received in operation 905 are for signals received by an access point, while the second RSSI information is of RSSIs measured at a wireless terminal. The second RSSI information indicates signal strength of signals received from access points "visible" to the wireless terminal. In the example embodiment of FIG. 9, this includes RSSI measurements of signals received from the first and second AP at the wireless terminal.

In some embodiments of operation 930, statistics are received from each of the plurality of access points. In some embodiments, for each access point, the statistics indicate a number of wireless terminals associated with or connected to the access point.

In some embodiments, operation 930 then applies the received second RSSI information and received statistics according to Equation 5, discussed above, as $RSSI_{2nd}$ and $RSSI_{1st}$, with $RSSI_{1st}$ representing an RSSI measurement of signals from an AP with which the wireless terminal is currently associated and $RSSI_{2nd}$ representing an RSSI measurement of signal from an AP with which the WT is not associated. (both $RSSI_{1st}$ and $RSSI_{2nd}$ measured by the same WT).

Note that, as discussed above in some embodiments, unless a difference between $RSSI_{1st}$ and $RSSI_{2nd}$ is greater than a predetermined threshold (e.g. 6 dbm), the second AP is not considered as a candidate for association with the WT. The threshold is statically configured in some embodiments and is dynamically determined in other embodiments. As discussed above, in one example embodiment, the dynamic threshold is determined by calculating differences $RSSI_{ith}$–$RSSI_{kth}$ between APs as measured by WT's associated with the plurality of APs. These embodiments then determine an average of these differences between AP RSSI values and set the dynamic threshold to the average. Thus, if the difference between $RSSI_{1st}$ and $RSSI_{second}$ is above the average difference, the second AP is considered as a potential roaming target. If the difference is below the average difference, the second AP is not considered as a potential roaming target.

Other embodiments rely on a median value (rather than the average) of the differences when determining the dynamic threshold. In some embodiments that utilize a dynamically determined threshold, the threshold is periodically determined.

Some embodiments determine a value of $C_1$ $AP_{1st}$ density+$C_2$ $AP_{2nd}$ density–$C3$*(Num $WC_{1st}$–Num $WC_{2nd}$) for pairs of APs that are visible to any WT. In accordance with one preferred embodiment, averages of these numbers are determined. The dynamic threshold is then set to the average value. Alternatively, in other embodiments, a median of the values (rather than the average) is used as the dynamic threshold.

Even if a particular second AP is excluded from consideration for roaming by process 900, other APs may still be considered by process 900.

Note that while FIG. 9 above describes the comparison of two RSSI values to determine whether the wireless terminal roams from the first AP to the second AP, other embodiments may make multiple comparisons across multiple AP roaming options to determine whether a particular mobile device should transition or roam to one of those multiple APs. Thus, in some embodiments, operation 930 evaluates multiple versions of Equation 5, each version substituting different $RSSI_{2nd}$ values (e.g. for a third AP, different statistics for the third AP (e.g. number of wireless terminals connected to the third AP), and a different density metric (e.g. of the third AP). In these embodiments, multiple evaluations of Equation 5 will be compared to determine which evaluation shows the largest inequality between the left and right side of the equation. (e.g. which RSSI difference for each prospective transition is the greatest compared to the right side of the equation). In these embodiments a candidate AP (e.g. AP of $RSSI_{2nd}$ of Equation 5), having the largest inequality is selected as a target AP for the wireless terminal.

In some embodiments, process 900 classifies wireless terminals into at least two classifications. A first classification identifies wireless terminals associated with an access point that has an RSSI value, as measured by the wireless terminal, meeting a criterion (e.g. below a predetermined threshold). A second classification identifies other wireless terminals associated with an access point having an RSSI value, as measured by those wireless terminals, that does not meet the criterion (e.g. greater than or equal to the predetermined threshold). In some of these embodiments, process 900 only determines whether wireless terminals having the second classification are to roam or not. Wireless terminals having the first classification are not considered by process 900, except with regard to classifying them in the first classification. Thus, in these embodiments, process 900 evaluates AP densities, numbers of associated devices on APs, and RSSI values for wireless terminals of the second classification.

An instruction message is then sent to the wireless terminal indicating the wireless terminal is to roam to the target AP. In some aspects, the instruction message may include one or more of the fields discussed above with respect to example message portion 820. In some aspects, the instructions message is transmitted by the management server 706 to an AP with which the wireless terminal is associated (e.g. AP 702c). The AP then forwards the instruction to the wireless terminal (e.g. 704e).

Figure 10:
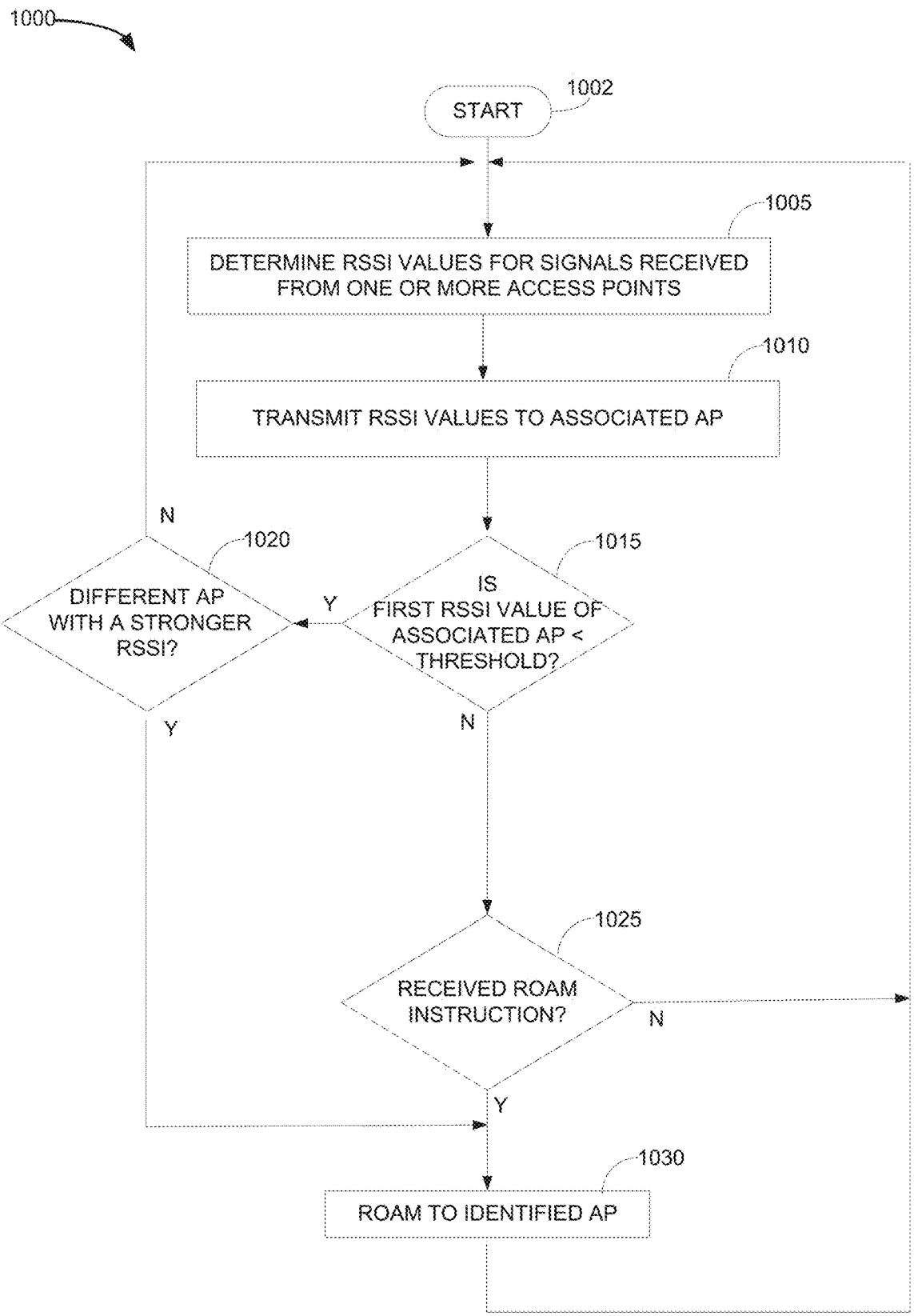
FIG. 10 is a flowchart of an example method of roaming by a wireless terminal.

FIG. 10 is a flowchart of an example method of roaming by a wireless terminal. In some embodiments, one or more of the functions discussed below with respect to FIG. 10 are performed by one or more of the wireless terminals 702a-c. In some aspects, one or more of the functions discussed below with respect to FIG. 10 are performed by hardware processing circuitry. For example, one or more hardware memories store instructions that when executed, configure the hardware processing circuitry to perform one or more of the operations discussed below.

After start operation 1002, process 1000 moves to operation 1005, which determines RSSI values for signals received from one or more access points. For example, as discussed above with respect to FIG. 7, wireless terminal 704e receives signals from the APs 702a and 702c, and determines RSSI values for those signals. Those RSSI values are then transmitted to the AP to which the wireless terminal 704e is associated (in the example of FIG. 7, this is AP 702c).

In operation 1010, the RSSI values are transmitted to an access point. In some embodiments, the RSSI values are transmitted to an access point associated with a device performing process 1000 (e.g. an associated station). These RSSI are used, in some embodiments, by the management server 706 to evaluate Equation 5, as discussed above.

After operation 1010, process 1000 moves to decision operation 1015. Decision operation 1015 evaluates whether a first RSSI value of an AP to which the executing device is associated or connected is below a predetermined threshold. If the RSSI value is below the predetermined threshold, process 1000 moves to decision operation 1020.

Decision operation 1020 determines whether a different AP (e.g. one to which the executing device is not associated), has a stronger second RSSI value. If a different second AP with a stronger RSSI is identified in decision operation 1020, process 1000 moves from decision operation 1020 to operation 1030, which transitions the wireless terminal from the associated AP to the new identified second AP If no AP with a stronger RSSI is available, process 1000 moves from decision operation 1020 back to operation 1005 and processing continues.

Returning back to decision operation 1015, if the first RSSI value of the associated AP is not below the predetermined threshold, process 1000 moves from decision operation 1015 to decision operation 1025, which determines whether a roaming instruction has been received from, for example, the management server 706 (e.g. indirectly via an the associated access point). If no roaming instructions has been received, process 1000 returns to operation 1005. Otherwise, if a roaming instruction has been received, process 1000 moves from decision operation 1025 to operation 1030, where the executing device roams from the first AP with which it is associated to a different AP as specified by the instruction (e.g. a target AP).

Figure 11:
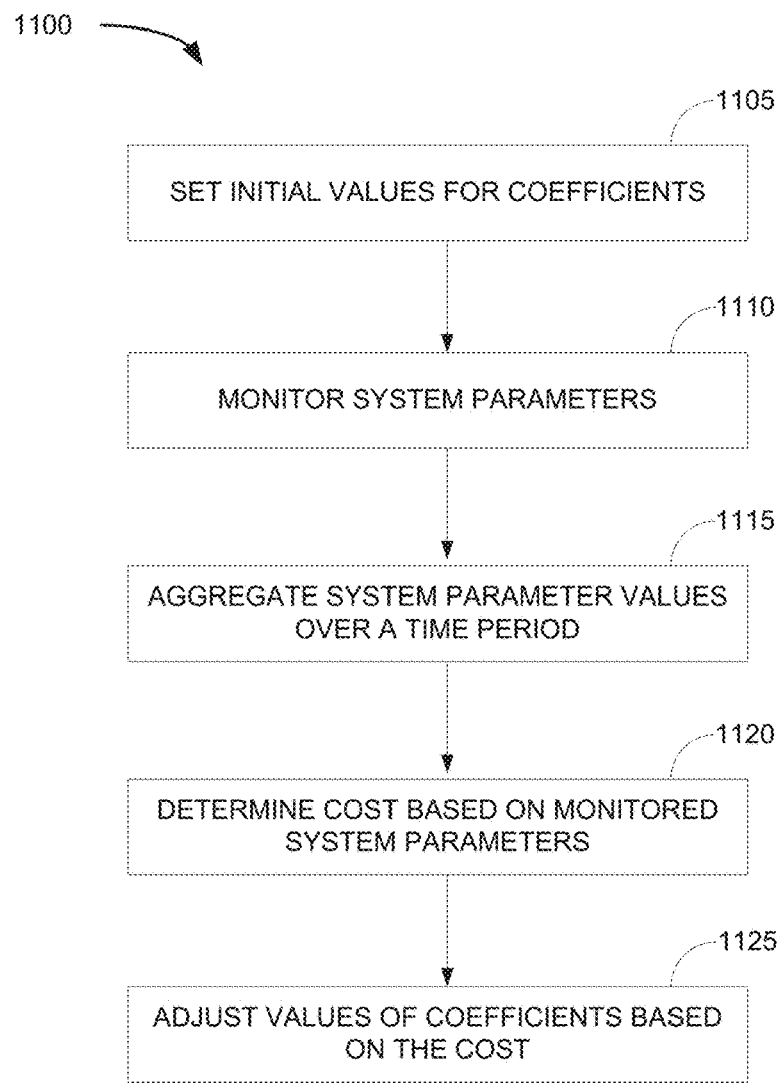
FIG. 11 is a flowchart of an example process for modifying coefficients used in at least some of the disclosed embodiments.

FIG. 11 is a flowchart of an example process for modifying coefficients used in at least some of the disclosed embodiments. For example, process 1100 discussed below adjusts one or more of C1, C2, and C3 discussed above with respect to equation 5.

In operation 1105, initial values for one or more coefficients are set. For example, separate initial values are set for one or more of C1, C2, and C3.

In operation 1110, system parameters are monitored. The system parameters may include, for example, an elapsed time between an association request transmission and association response reception. The association request is transmitted by a wireless terminal to an access point. The association response is transmitted by the AP to the wireless terminal.

In some embodiments, the system parameters may include an average RSSI of signals received by wireless terminals managed by the management server 706 within a defined time period. An average RSSI as measured by wireless terminals within a defined time period is included in the system parameters in some embodiments. A data throughput of devices managed by the management server 706 is included in the system parameters in one or more embodiments. In some embodiments, the system parameters may include occurrences of roaming events by a wireless terminal within a defined time period. In some embodiments, the system parameters include a percentage of association requests that are successful.

In operation 1115, system parameter values are aggregated over a time period. For example, in some embodiments of operation 1115, averages, medians, or statistical modes, of one or more of the number of roaming events, elapsed time between association request and response, RSSI values experienced by a wireless terminals, or throughput is determined.

In operation 1120, a cost is determined based on the monitored system parameters. In some embodiments, the cost is determined by operation 1120 according to Equation 6 above. In some embodiments, operation 1120 determines a first cost for a first time period, a second cost for a second time period, and a third time period (e.g. in some embodiments, this supports computation of Equation 7 in operation 1125 as discussed below. The first, second, and third time periods can correspond to "previous time period," "current time period," and "next time period," as discussed above with respect to Equation. 7.

Some embodiments of a cost function applied by operation 1120 recognize that some portion of the system parameter values are proportional or positively correlated to a cost of system operation. Thus, when these parameter values increase, cost also generally increases. In some embodiments, a second portion of the system parameters are recognized to be inversely proportional or negatively correlated to operational cost. In the specific example of Equation 6 which associates the coefficient Θ 1 with the average RSSI, the cost function is configured to note that average RSSI is negatively correlated with cost. Therefore, by modifying system parameters such that a cost determined by the cost function is reduced, the changes contribute to an increased average RSSI. The coefficient Θ 2 is used in conjunction with the average latency. The cost function is configured to recognize that latency is positively correlated with cost. Therefore, by changing system parameters such that a cost determined by the cost function is reduced, the changes contribute to a reduction in average latency. Coefficient Θ 3 is used in conjunction with an average number of roaming events. The number of roaming events is positively correlated with cost. Therefore, by modifying system parameters that result in a reduced cost determined by the cost function, the average latency would be decreased.

In operation 1125, the coefficients are adjusted based on a cost calculated at a first time period and a second cost calculated for a second time period previous to the first time period. In some aspects, operation 1125 applies Equation 7 to adapt the coefficients e.g., C1, C2, and C3, of Equation 5 so as to minimize the cost determined in operation 1120. Operation 1125 seeks to adjust the coefficient values such that the cost is minimized. As discussed above with respect to Equation 7 and operation 1120, the costs determined for the first, second, and third time periods in operation 1120 support determination of coefficients using Equation 7.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

Example 1 is a method performed by hardware processing circuitry of a multi-access point controller, comprising: receiving, from each of a plurality of access points (APs), first received signal strength indication (RSSI) values of AP generated signals measured by the respective AP; receiving, from a first access point (AP), a second RSSI value for each of a first and second AP generated signal measured by a wireless terminal; determining, for each of the first and second AP, a number of wireless terminals associated with the respective AP; and instructing a wireless terminal to transition from the first AP to the second AP based at least in part of the number of terminals associated with each of the first and second APs, and the received first and second RSSI values.

In Example 2, the subject matter of Example 1 optionally includes determining the second RSSI value of the first AP generated signal received by the wireless terminal is above a threshold, wherein the instructing is based on the determination.

In Example 3, the subject matter of any one or more of Examples 1-2 optionally include aggregating the received first RSSI values, wherein the instructing of the wireless terminal is further based on the aggregation.

In Example 4, the subject matter of Example 3 optionally includes determining a standard deviation of the first RSSI values, wherein the instructing of the wireless terminal is further based on the standard deviation.

In Example 5, the subject matter of Example 4 optionally includes determining, for each of the first RSSI values, a difference between the first RSSI value and the aggregation; and determining, for each of the first RSSI values, a contribution of the first RSSI value by dividing the respective difference by the standard deviation; and separately aggregating, for each of a plurality of APs including the first and second AP, the contributions of first RSSI values that were obtained based on a signal received from the respective AP, wherein the instructing of the wireless terminal to transition to the second AP is further based on the separate aggregation of contributions of first RSSI values obtained based on RSSI values received from the second AP.

In Example 6, the subject matter of Example 5 optionally includes determining, for each of the plurality of APs, a density of the AP based on the APs aggregated contributions, the determined densities including a first density for the first AP and a second density for the second AP, wherein the instructing of the wireless terminal to transition to the second AP is based on the second density.

In Example 7, the subject matter of any one or more of Examples 1-6 optionally include determining a first difference between the first AP and second AP first RSSI values; and determining a second difference between the number of wireless terminals associated with the first AP and the number of wireless terminals associated with the second AP, wherein the instructing of the wireless terminal to transition to the second AP is based on the first difference and the second difference.

In Example 8, the subject matter of Example 7 optionally includes wherein the instructing of the wireless terminal to transition to the second AP further comprises relating the first difference to an aggregation of the first density and the second density.

In Example 9, the subject matter of Example 8 optionally includes (C1*first density)+(C2*second density)−(C3*the second difference), where C1, C2, and C3 are coefficients.

In Example 10, the subject matter of Example 9 optionally includes determining a difference between second RSSI values of the first and second AP; and comparing the difference to a transition threshold, wherein the instructing of the wireless terminal to transition is based on the comparison.

In Example 11, the subject matter of Example 10 optionally includes wherein the transition threshold is a preconfigured value.

In Example 12, the subject matter of any one or more of Examples 10-11 optionally include determining pairs of APs included in the plurality of APs; determining differences between second RSSI values of the pairs; and determining the transition threshold based on the determined differences.

In Example 13, the subject matter of Example 12 optionally includes determining, for each pair of the determined pairs of APs, a value of C1*a density of a first AP in the pair+C2*a second density of a second AP of the pair−C3*a difference between a number of wireless terminals associated with each of the first and second APs of the pair; aggregating the values; determining the transition threshold based on the aggregated values.

In Example 14, the subject matter of any one or more of Examples 9-13 optionally include receiving a third AP RSSI value obtained by the wireless terminal based on a signal from a third AP; determining a third difference between the first AP RSSI value and the third AP RSSI value; and determining a fourth difference between the number of stations associated with the first AP and a number of stations associated with the third AP, wherein the instructing of the wireless terminal is based on the third difference and the fourth difference.

In Example 15, the subject matter of Example 14 optionally includes the densities of each AP include a third density of the third AP, the method further comprising determining a second relation between the third difference and (C1*first density)+(C2*third density)−(C3*the fourth difference), wherein the instructing of the wireless terminal is based on the second relation.

In Example 16, the subject matter of Example 15 optionally includes determining the first relation comprises determining a fifth difference by subtracting (C1*first density)+(C2*second density)−(C3*the second difference) from the first difference, and wherein determining the second relation comprises determining a sixth difference by subtracting (C1*first density)+(C2*third density)−(C3*the fourth difference), from the third difference, wherein the instructing of the wireless terminal comprises selecting the second AP in response to the fifth difference being larger than the sixth difference.

In Example 17, the subject matter of any one or more of Examples 9-16 optionally include determining first and second aggregations of SLE parameter values during a first and second time period respectively; determining a first cost value for the first time period and a second cost value for the second period based on each of the first and second SLE parameter aggregations; and determining the coefficients C1, C2, and C3 using a machine learning model and the first and second cost values.

In Example 18, the subject matter of Example 17 optionally includes determining a first and second aggregation of RSSI values received from each of the plurality of access points during a first and second time period respectively; determining a first and second aggregation of latency measurements received from each of the plurality of access points during the first and second time period respectively; determining a first and second aggregation of roaming events during the first and second time period respectively, wherein the determining of the first and second cost values is based on one or more of the first and second aggregation of RSSI values, first and second aggregation of latency measurements, and first and second aggregation of roaming events respectively.

In Example 19, the subject matter of any one or more of Examples 17-18 optionally include wherein the determining of the coefficients comprises invoking a gradient descent algorithm.

Example 20 is a system, comprising: hardware processing circuitry; one or more hardware memories storing instructions that when executed configure the hardware processing circuitry to perform operations comprising: receiving, from each of a plurality of access points (APs), first received signal strength indication (RSSI) values of AP generated signals measured by the respective AP, receiving, from a first access point (AP), a second RSSI value for each of a first and second AP generated signal measured by a wireless terminal, determining, for each of the first and second AP, a number of wireless terminals associated with the respective AP, and instructing a wireless terminal to transition from the first AP to the second AP based at least in part of the number of terminals associated with each of the first and second APs, and the received first and second RSSI values.

In Example 21, the subject matter of Example 20 optionally includes determining the second RSSI value of the first AP generated signal received by the wireless terminal is above a threshold, wherein the instructing is based on the determination.

In Example 22, the subject matter of any one or more of Examples 20-21 optionally include the operations further comprising aggregating the received first RSSI values, wherein the instructing of the wireless terminal is further based on the aggregation.

In Example 23, the subject matter of Example 22 optionally includes the operations further comprising determining a standard deviation of the first RSSI values, wherein the instructing of the wireless terminal is further based on the standard deviation.

In Example 24, the subject matter of Example 23 optionally includes the operations further comprising determining, for each of the first RSSI values, a difference between the first RSSI value and the aggregation; and determining, for each of the first RSSI values, a contribution of the first RSSI value by dividing the respective difference by the standard deviation; and separately aggregating, for each of a plurality of APs including the first and second AP, the contributions of first RSSI values that were obtained based on a signal received from the respective AP, wherein the instructing of the wireless terminal to transition to the second AP is further based on the separate aggregation of contributions of first RSSI values obtained based on RSSI values received from the second AP.

In Example 25, the subject matter of Example 24 optionally includes the operations further comprising determining, for each of the plurality of APs, a density of the AP based on the APs aggregated contributions, the determined densities including a first density for the first AP and a second density for the second AP, wherein the instructing of the wireless terminal to transition to the second AP is based on the second density.

In Example 26, the subject matter of any one or more of Examples 20-25 optionally include the operations further comprising determining a first difference between the first AP and second AP first RSSI values; and determining a second difference between the number of wireless terminals associated with the first AP and the number of wireless terminals associated with the second AP, wherein the instructing of the wireless terminal to transition to the second AP is based on the first difference and the second difference.

In Example 27, the subject matter of Example 26 optionally includes wherein the instructing of the wireless terminal to transition to the second AP further comprises relating the first difference to an aggregation of the first density and the second density.

In Example 28, the subject matter of Example 27 optionally includes wherein the instructing of the wireless terminal to transition to the second AP is based on a relation of the first difference to (C1*first density)+(C2*second density)−(C3*the second difference), where C1, C2, and C3 are coefficients.

In Example 29, the subject matter of Example 28 optionally includes the operations further comprising determining a difference between second RSSI values of the first and second AP; and comparing the difference to a transition threshold, wherein the instructing of the wireless terminal to transition is based on the comparison.

In Example 30, the subject matter of Example 29 optionally includes wherein the transition threshold is a preconfigured value.

In Example 31, the subject matter of any one or more of Examples 29-30 optionally include the operations further comprising: determining pairs of APs included in the plurality of APs; determining differences between second RSSI values of the pairs; and determining the transition threshold based on the determined differences.

In Example 32, the subject matter of Example 31 optionally includes the operations further comprising determining, for each pair of the determined pairs of APs, a value of C1*a density of a first AP in the pair+C2*a second density of a second AP of the pair−C3*a difference between a number of wireless terminals associated with each of the first and second APs of the pair; aggregating the values; determining the transition threshold based on the aggregated values.

In Example 33, the subject matter of any one or more of Examples 28-32 optionally include the operations further comprising: receiving a third AP RSSI value obtained by the wireless terminal based on a signal from a third AP; determining a third difference between the first AP RSSI value and the third AP RSSI value; and determining a fourth difference between the number of stations associated with the first AP and a number of stations associated with the third AP, wherein the instructing of the wireless terminal is based on the third difference and the fourth difference.

In Example 34, the subject matter of Example 33 optionally includes the densities of each AP include a third density of the third AP, the method further comprising determining a second relation between the third difference and (C1*first density)+(C2*third density)−(C3*the fourth difference), wherein the instructing of the wireless terminal is based on the second relation.

In Example 35, the subject matter of Example 34 optionally includes wherein determining the first relation comprises determining a fifth difference by subtracting (C1*first density)+(C2*second density)−(C3*the second difference) from the first difference, and wherein determining the second relation comprises determining a sixth difference by subtracting (C1*first density)+(C2*third density)−(C3*the fourth difference), from the third difference, wherein the instructing of the wireless terminal comprises selecting the second AP in response to the fifth difference being larger than the sixth difference.

In Example 36, the subject matter of any one or more of Examples 28-35 optionally include the operations further comprising: determining a first and second aggregations of SLE parameter values during a first and second time period respectively; determining a first cost value for the first time period and a second cost value for the second period based on each of the first and second SLE parameter aggregations; and determining the coefficients C1, C2, and C3 using a machine learning model and the first and second cost values.

In Example 37, the subject matter of Example 36 optionally includes the operations further comprising: determining a first and second aggregation of RSSI values received from each of the plurality of access points during a first and second time period respectively; determining a first and second aggregation of latency measurements received from each of the plurality of access points during the first and second time period respectively; determining a first and second aggregation of roaming events during the first and second time period respectively, wherein the determining of the first and second cost values is based on one or more of the first and second aggregation of RSSI values, first and second aggregation of latency measurements, and first and second aggregation of roaming events respectively.

In Example 38, the subject matter of any one or more of Examples 36-37 optionally include wherein the determining of the coefficients comprises invoking a gradient descent algorithm.

Example 39 is a non-transitory computer readable storage medium comprising instructions that when executed configure hardware processing circuitry to perform operations comprising: receiving, from each of a plurality of access points (APs), first received signal strength indication (RSSI) values of AP generated signals measured by the respective AP; receiving, from a first access point (AP), a second RSSI value for each of a first and second AP generated signal measured by a wireless terminal; determining, for each of the first and second AP, a number of wireless terminals associated with the respective AP; and instructing a wireless terminal to transition from the first AP to the second AP based at least in part of the number of terminals associated with each of the first and second APs, and the received first and second RSSI values.

In Example 40, the subject matter of Example 39 optionally includes determining the second RSSI value of the first AP generated signal received by the wireless terminal is above a threshold, wherein the instructing is based on the determination.

In Example 41, the subject matter of any one or more of Examples 39-40 optionally include the operations further comprising aggregating the received first RSSI values, wherein the instructing of the wireless terminal is further based on the aggregation.

In Example 42, the subject matter of Example 41 optionally includes the operations further comprising determining a standard deviation of the first RSSI values, wherein the instructing of the wireless terminal is further based on the standard deviation.

In Example 43, the subject matter of Example 42 optionally includes the operations further comprising determining, for each of the first RSSI values, a difference between the first RSSI value and the aggregation; and determining, for each of the first RSSI values, a contribution of the first RSSI value by dividing the respective difference by the standard deviation; and separately aggregating, for each of a plurality of APs including the first and second AP, the contributions of first RSSI values that were obtained based on a signal received from the respective AP, wherein the instructing of the wireless terminal to transition to the second AP is further based on the separate aggregation of contributions of first RSSI values obtained based on RSSI values received from the second AP.

In Example 44, the subject matter of Example 43 optionally includes the operations further comprising determining, for each of the plurality of APs, a density of the AP based on the APs aggregated contributions, the determined densities including a first density for the first AP and a second density for the second AP, wherein the instructing of the wireless terminal to transition to the second AP is based on the second density.

In Example 45, the subject matter of any one or more of Examples 39-44 optionally include the operations further comprising determining a first difference between the first AP and second AP first RSSI values; and determining a second difference between the number of wireless terminals associated with the first AP and the number of wireless terminals associated with the second AP, wherein the instructing of the wireless terminal to transition to the second AP is based on the first difference and the second difference.

In Example 46, the subject matter of Example 45 optionally includes wherein the instructing of the wireless terminal to transition to the second AP further comprises relating the first difference to an aggregation of the first density and the second density.

In Example 47, the subject matter of Example 46 optionally includes are coefficients.

In Example 48, the subject matter of Example 47 optionally includes the operations further comprising determining a difference between second RSSI values of the first and second AP; and comparing the difference to a transition threshold, wherein the instructing of the wireless terminal to transition is based on the comparison.

In Example 49, the subject matter of Example 48 optionally includes wherein the transition threshold is a preconfigured value.

In Example 50, the subject matter of any one or more of Examples 48-49 optionally include the operations further comprising: determining pairs of APs included in the plurality of APs; determining differences between second RSSI values of the pairs; and determining the transition threshold based on the determined differences.

In Example 51, the subject matter of Example 50 optionally includes the operations further comprising determining, for each pair of the determined pairs of APs, a value of $C1*a$ density of a first AP in the pair+$C2*a$ second density of a second AP of the pair-$C3*a$ difference between a number of wireless terminals associated with each of the first and second APs of the pair; aggregating the values; determining the transition threshold based on the aggregated values.

In Example 52, the subject matter of any one or more of Examples 28-51 optionally include the operations further comprising: receiving a third AP second RSSI value obtained by the wireless terminal based on a signal from a third AP; determining a third difference between the first AP's second RSSI value and the third AP's second RSSI value; and determining a fourth difference between the number of stations associated with the first AP and a number of stations associated with the third AP, wherein the instructing of the wireless terminal is based on the third difference and the fourth difference.

In Example 53, the subject matter of Example 52 optionally includes wherein the densities of each AP include a third density of the third AP, the method further comprising determining a second relation between the third difference and ($C1*$first density)+($C2*$third density)-($C3*$the fourth difference), wherein the instructing of the wireless terminal is based on the second relation.

In Example 54, the subject matter of Example 53 optionally includes wherein determining the first relation comprises determining a fifth difference by subtracting ($C1*$first density)+($C2*$second density)-($C3*$the second difference) from the first difference, and wherein determining the second relation comprises determining a sixth difference by subtracting ($C1*$first density)+($C2*$third density)-($C3*$the fourth difference), from the third difference, wherein the instructing of the wireless terminal comprises selecting the second AP in response to the fifth difference being larger than the sixth difference.

In Example 55, the subject matter of any one or more of Examples 28-54 optionally include the operations further comprising: determining a first and second aggregations of SLE parameter values during a first and second time period respectively; determining a first cost value for the first time period and a second cost value for the second period based on each of the first and second SLE parameter aggregations; and determining the coefficients C1, C2, and C3 using a machine learning model and the first and second cost values.

In Example 56, the subject matter of Example 55 optionally includes the operations further comprising: determining a first and second aggregation of first RSSI values received from each of the plurality of access points during a first and second time period respectively; determining a first and second aggregation of latency measurements received from each of the plurality of access points during the first and second time period respectively; determining a first and second aggregation of roaming events during the first and second time period respectively, wherein the determining of the first and second cost values is based on one or more of the first and second aggregation of RSSI values, first and second aggregation of latency measurements, and first and second aggregation of roaming events respectively.

In Example 57, the subject matter of any one or more of Examples 55-56 optionally include wherein the determining of the coefficients comprises invoking a gradient descent algorithm.

Example 58 is an apparatus, comprising: means for receiving, from each of a plurality of access points (APs), first received signal strength indication (RSSI) values of AP generated signals measured by the respective AP; means for receiving, from a first access point (AP), a second RSSI value for each of a first and second AP generated signal measured by a wireless terminal; means for determining, for each of the first and second AP, a number of wireless terminals associated with the respective AP; and means for instructing a wireless terminal to transition from the first AP to the second AP based at least in part of the number of terminals associated with each of the first and second APs, and the received first and second RSSI values.

In Example 59, the subject matter of Example 58 optionally includes means for determining the second RSSI value of the first AP generated signal received by the wireless terminal is above a threshold, wherein the instructing is based on the determination.

In Example 60, the subject matter of any one or more of Examples 58-59 optionally include means for aggregating the received first RSSI values, wherein the means for instructing of the wireless terminal is further configured to base the instruction on the aggregation.

In Example 61, the subject matter of Example 60 optionally includes means for determining a standard deviation of the first RSSI values, wherein the instructing of the wireless terminal is further based on the standard deviation.

In Example 62, the subject matter of Example 61 optionally includes means for determining, for each of the first RSSI values, a difference between the first RSSI value and the aggregation; and means for determining, for each of the first RSSI values, a contribution of the first RSSI value by dividing the respective difference by the standard deviation; and means for separately aggregating, for each of a plurality of APs including the first and second AP, the contributions of first RSSI values that were obtained based on a signal received from the respective AP, wherein the instructing of the wireless terminal to transition to the second AP is further based on the separate aggregation of contributions of first RSSI values obtained based on RSSI values received from the second AP.

In Example 63, the subject matter of Example 62 optionally includes means for determining, for each of the plurality of APs, a density of the AP based on the APs aggregated contributions, the determined densities including a first density for the first AP and a second density for the second AP, wherein the instructing of the wireless terminal to transition to the second AP is based on the second density.

In Example 64, the subject matter of any one or more of Examples 58-63 optionally include means for determining a first difference between the first AP and second AP first RSSI values; and means for determining a second difference between the number of wireless terminals associated with the first AP and the number of wireless terminals associated with the second AP, wherein the instructing of the wireless terminal to transition to the second AP is based on the first difference and the second difference.

In Example 65, the subject matter of Example 64 optionally includes wherein the means for instructing the wireless terminal to transition to the second AP is configured to relate the first difference to an aggregation of the first density and the second density.

In Example 66, the subject matter of any one or more of Examples 64-65 optionally include are coefficients.

In Example 67, the subject matter of Example 66 optionally includes means for determining a difference between second RSSI values of the first and second AP; and means for comparing the difference to a transition threshold, wherein the instructing of the wireless terminal to transition is based on the comparison.

In Example 68, the subject matter of Example 67 optionally includes wherein the transition threshold is a preconfigured value.

In Example 69, the subject matter of any one or more of Examples 67-68 optionally include means for determining pairs of APs included in the plurality of APs; means for determining differences between second RSSI values of the pairs; and means for determining the transition threshold based on the determined differences.

In Example 70, the subject matter of Example 69 optionally includes means for determining, for each pair of the determined pairs of APs, a value of $C1*$a density of a first AP in the pair+$C2*$a second density of a second AP of the pair$-C3*$a difference between a number of wireless terminals associated with each of the first and second APs of the pair; means for aggregating the values; means for determining the transition threshold based on the aggregated values.

In Example 71, the subject matter of any one or more of Examples 66-70 optionally include means for receiving a third AP second RSSI value obtained by the wireless terminal based on a signal from a third AP; means for determining a third difference between the first AP's second RSSI value and the third AP's second RSSI value; and means for determining a fourth difference between the number of stations associated with the first AP and a number of stations associated with the third AP, wherein the instructing of the wireless terminal is based on the third difference and the fourth difference.

In Example 72, the subject matter of Example 71 optionally includes wherein the densities of each AP include a third density of the third AP, the apparatus further comprising means for determining a second relation between the third difference and ($C1*$first density)+($C2*$third density)−($C3*$the fourth difference), wherein the instructing of the wireless terminal is based on the second relation.

In Example 73, the subject matter of Example 72 optionally includes wherein the means for determining the first relation is configured to determine a fifth difference by subtracting ($C1*$first density)+($C2*$second density)−($C3*$the second difference) from the first difference, and the means for determining the second relation is configured to determine a sixth difference by subtracting ($C1*$first density)+($C2*$third density)−($C3*$the fourth difference), from the third difference, and the means for instructing the wireless terminal is configured to select the second AP in response to the fifth difference being larger than the sixth difference.

In Example 74, the subject matter of any one or more of Examples 66-73 optionally include means for determining a first and second aggregations of SLE parameter values during a first and second time period respectively; means for determining a first cost value for the first time period and the second cost value for a second period based on each of the first and second SLE parameter aggregations; and means for determining the coefficients C1, C2, and C3 using a machine learning model and the first and second cost values.

In Example 75, the subject matter of Example 74 optionally includes means for determining a first and second aggregation of first RSSI values received from each of the plurality of access points during a first and second time period respectively; means for determining a first and second aggregation of latency measurements received from each of the plurality of access points during the first and second time period respectively; means for determining a first and second aggregation of roaming events during the first and second time period respectively, wherein the determining of the first and second cost values is based on one or more of the first and second aggregation of RSSI values, first and second aggregation of latency measurements, and first and second aggregation of roaming events respectively.

In Example 76, the subject matter of any one or more of Examples 74-75 optionally include wherein the means for determining the coefficients is configured to invoke a gradient descent algorithm to determine the coefficients The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A method, comprising:
   receiving, from a plurality of access points (APs), one or more received signal strength indicator (RSSI) measurements, each of the one or more RSSI measurements corresponding to a wireless signal transmitted by one AP of the plurality of APs and received by another AP of the plurality of APs; and
   instructing a wireless terminal (WT) associated with a first AP of the plurality of APs to transition from the first AP to a second AP of the plurality of APs based on the RSSI measurements received from at two or more of the plurality of APs and based on a difference between a number of WTs associated with the first AP and a number of WTs associated with the second AP.

2. The method of claim 1, wherein instructing the WT associated with the first AP of the plurality of APs to transition from the first AP to the second AP of the plurality of APs further comprises:
   in response to determining a first signal strength of the first AP at the WT is less than a second signal strength of the second AP at the WT, instructing the WT associated with the first AP of the plurality of APs to transition from the first AP to the second AP of the plurality of APs.

3. The method of claim 1, wherein the plurality of APs is located within a common deployment site.

4. The method of claim 1, wherein instructing the WT associated with the first AP of the plurality of APs to transition from the first AP to the second AP of the plurality of APs further comprises:
   determining a signal strength difference of a first signal strength of the first AP at the WT and a second signal strength of the second AP at the WT; and
   instructing the WT associated with the first AP of the plurality of APs to transition from the first AP to the second AP of the plurality of APs based on the signal strength difference.

5. The method of claim 1, further comprising:
for each AP of the plurality of APs, aggregating the RSSI measurements measured by the AP to obtain an aggregated RSSI measurement for the AP,
wherein instructing the WT associated with the first AP of the plurality of APs to transition from the first AP to the second AP of the plurality of APs is further based on the aggregated RSSI measurement for the first AP of the plurality of APs and the aggregated RSSI measurement for the second AP of the plurality of APs.

6. The method of claim 1, further comprising:
for each AP of the plurality of APs, determining a standard deviation of the RSSI measurements measured by the AP,
wherein instructing the WT associated with the first AP of the plurality of APs to transition from the first AP to the second AP of the plurality of APs is further based on the standard deviation of the RSSI measurements measured by the first AP of the plurality of APs and the standard deviation of the RSSI measurements measured by the second AP of the plurality of APs.

7. The method of claim 1, further comprising:
determining differences between signal measurements made by the WT of signals from pairs of APs, each AP in each pair included in the plurality of APs; and
determining a transition threshold based on the determined differences,
wherein instructing the WT associated with the first AP of the plurality of APs to transition from the first AP to the second AP of the plurality of APs is further based on the transition threshold.

8. The method of claim 1, further comprising:
determining a plurality of differences between RSSI measurements of wireless signals received from pairs of APs as measured by a plurality of WTs;
setting a dynamic threshold based on an average difference between the RSSI measurements; and
in response to determining a difference between the RSSI of the second AP and the RSSI of the first AP satisfies the dynamic threshold, instructing the wireless terminal (WT) associated with the first AP of the plurality of APs to transition from the first AP to the second AP of the plurality of APs based on the plurality of RSSI measurements received from at least some of the plurality of APs and based on the difference between the number of WTs associated with the first AP and the number of WTs associated with the second AP.

9. The method of claim 1, further comprising:
determining a plurality of differences between RSSI measurements of wireless signals received from pairs of APs as measured by a plurality of WTs; and
setting a dynamic threshold based on an average difference between the RSSI measurements,
wherein instructing the WT associated with the first AP of the plurality of APs to transition from the first AP to the second AP of the plurality of APs is further based on the dynamic threshold.

10. The method of claim 1, further comprising:
for each AP of the plurality of APs, determining an AP density metric indicating a cumulative contribution of the AP to an overall AP density for the plurality of APs,
wherein instructing the WT associated with the first AP of the plurality of APs to transition from the first AP to the second AP of the plurality of APs is further based on the AP density metric for the first AP and the AP density metric for the second AP.

11. A system, comprising:
hardware processing circuitry;
one or more hardware memories storing instructions that when executed configure the hardware processing circuitry to perform operations comprising:
receiving, from a plurality of access points (APs), one or more received signal strength indicator (RSSI) measurements, each of the one or more RSSI measurements corresponding to a wireless signal transmitted by one AP of the plurality of APs and received by another AP of the plurality of APs; and
instructing a wireless terminal (WT) associated with a first AP of the plurality of APs to transition from the first AP to a second AP of the plurality of APs based on the RSSI measurements received from at two or more of the plurality of APs and based on a difference between a number of WTs associated with the first AP and a number of WTs associated with the second AP.

12. The system of claim 11, wherein instructing the WT associated with the first AP of the plurality of APs to transition from the first AP to the second AP of the plurality of APs further comprises:
in response to determining a first signal strength of the first AP at the WT is less than a second signal strength of the second AP at the WT, instructing the WT associated with the first AP of the plurality of APs to transition from the first AP to the second AP of the plurality of APs.

13. The system of claim 11, wherein the plurality of APs is located within a common deployment site.

14. The system of claim 11, wherein instructing the WT associated with the first AP of the plurality of APs to transition from the first AP to the second AP of the plurality of APs further comprises:
determining a signal strength difference of a first signal strength of the first AP at the WT and a second signal strength of the second AP at the WT; and
instructing the WT associated with the first AP of the plurality of APs to transition from the first AP to the second AP of the plurality of APs based on the signal strength difference.

15. The system of claim 11, the one or more hardware memories further storing instructions that when executed configure the hardware processing circuitry to perform operations comprising:
for each AP of the plurality of APs, aggregating the RSSI measurements measured by the AP to obtain an aggregated RSSI measurement for the AP,
wherein instructing the WT associated with the first AP of the plurality of APs to transition from the first AP to the second AP of the plurality of APs is further based on the aggregated RSSI measurements for the first AP of the plurality of APs and the aggregated RSSI measurements for the second AP of the plurality of APs.

16. The system of claim 11, the one or more hardware memories further storing instructions that when executed configure the hardware processing circuitry to perform operations comprising:
for each AP of the plurality of APs, determining a standard deviation of the RSSI measurements measured by the AP,
wherein instructing the WT associated with the first AP of the plurality of APs to transition from the first AP to the second AP of the plurality of APs is further based on the standard deviation of the RSSI measurements measured by the first AP of the plurality of APs and the standard deviation of the RSSI measurements measured by the second AP of the plurality of APs.

17. The system of claim 11, the one or more hardware memories further storing instructions that when executed configure the hardware processing circuitry to perform operations comprising:
- determining differences between signal measurements made by the WT of signals from pairs of APs, each AP in each pair included in the plurality of APs; and
- determining a transition threshold based on the determined differences,
- wherein instructing the WT associated with the first AP of the plurality of APs to transition from the first AP to the second AP of the plurality of APs is further based on the transition threshold.

18. The system of claim 11, the one or more hardware memories further storing instructions that when executed configure the hardware processing circuitry to perform operations comprising:
- determining a plurality of differences between RSSI measurements of wireless signals received from pairs of APs as measured by a plurality of WTs; and
- setting a dynamic threshold based on an average difference between the RSSI measurements,
- wherein instructing the WT associated with the first AP of the plurality of APs to transition from the first AP to the second AP of the plurality of APs is further based on the dynamic threshold.

19. The system of claim 11, the one or more hardware memories further storing instructions that when executed configure the hardware processing circuitry to perform operations comprising:
- for each AP of the plurality of APs, determining an AP density metric indicating a cumulative contribution of the AP to an overall AP density for the plurality of APs,
- wherein instructing the WT associated with the first AP of the plurality of APs to transition from the first AP to the second AP of the plurality of APs is further based on the AP density metric for the first AP and the AP density metric for the second AP.

20. A non-transitory computer readable storage medium comprising instructions that when executed configure hardware processing circuitry to perform operations comprising:
- receiving, from a plurality of access points (APs), one or more received signal strength indicator (RSSI) measurements, each of the one or more RSSI measurements corresponding to a wireless signal transmitted by one AP of the plurality of APs and received by another AP of the plurality of APs; and
- instructing a wireless terminal (WT) associated with a first AP of the plurality of APs to transition from the first AP to a second AP of the plurality of APs based on the RSSI measurements received from at two or more of the plurality of APs and based on a difference between a number of WTs associated with the first AP and a number of WTs associated with the second AP.

* * * * *